United States Patent
Kancherla

(10) Patent No.: US 10,454,760 B2
(45) Date of Patent: Oct. 22, 2019

(54) LAYER-3 OVERLAY GATEWAYS

(71) Applicant: AVAGO TECHNOLOGIES INTERNATIONAL SALES PTE. LIMITED, Singapore (SG)

(72) Inventor: Mani Prasad Kancherla, Cupertino, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 914 days.

(21) Appl. No.: 13/899,849

(22) Filed: May 22, 2013

(65) Prior Publication Data

US 2013/0318219 A1 Nov. 28, 2013

Related U.S. Application Data

(60) Provisional application No. 61/650,943, filed on May 23, 2012.

(51) Int. Cl.
*G06F 13/00* (2006.01)
*H04L 12/24* (2006.01)
(Continued)

(52) U.S. Cl.
CPC ...... *H04L 41/0806* (2013.01); *H04L 12/4633* (2013.01); *H04L 49/70* (2013.01); *H04L 41/0803* (2013.01)

(58) Field of Classification Search
CPC ............... H04L 29/06; H04L 29/08981; H04L 29/08072; H04L 41/0806; H04L 45/00;
(Continued)

(56) References Cited

U.S. PATENT DOCUMENTS

| 829,529 A | 8/1906 | Keathley |
|---|---|---|
| 5,390,173 A | 2/1995 | Spinney |

(Continued)

FOREIGN PATENT DOCUMENTS

| CN | 102801599 A | 11/2012 |
|---|---|---|
| EP | 0579567 | 5/1993 |

(Continued)

OTHER PUBLICATIONS

Office Action for U.S. Appl. No. 13/533,843, filed Jun. 26, 2012, dated Oct. 21, 2013.

(Continued)

*Primary Examiner* — Robert B Harrell
(74) *Attorney, Agent, or Firm* — Xsensus LLP

(57) ABSTRACT

One embodiment of the present invention provides a computing system. The computing system includes a processor and a computer-readable storage medium for storing instructions. Based on the instructions, the processor operates the computing system as an overlay gateway. The computing system initiates and terminates an overlay tunnel associated with a virtual machine. During operation, the computing system maps a virtual Internet Protocol (IP) address of the virtual machine to a second IP address used to terminate the overlay tunnel based on information received from a configuration system. The computing system then determines an output port for a data packet based on the second IP address. The data packet comprises an inner packet and the destination address of this inner packet corresponds to the virtual IP address.

23 Claims, 10 Drawing Sheets

(51) Int. Cl.
*H04L 12/931* (2013.01)
*H04L 12/46* (2006.01)

(58) Field of Classification Search
CPC ... H04L 47/10; H04L 49/351; H04L 29/0653; G06F 9/4416
USPC .......................................... 709/222; 370/389
See application file for complete search history.

(56) References Cited

U.S. PATENT DOCUMENTS

| | | | |
|---|---|---|---|
| 5,802,278 A | 9/1998 | Isfeld | |
| 5,878,232 A | 3/1999 | Marimuthu | |
| 5,959,968 A * | 9/1999 | Chin | H04L 12/4604 370/216 |
| 5,973,278 A | 10/1999 | Wehrill, III | |
| 5,983,278 A | 11/1999 | Chong | |
| 6,041,042 A | 3/2000 | Bussiere | |
| 6,085,238 A | 7/2000 | Yuasa | |
| 6,104,696 A | 8/2000 | Kadambi | |
| 6,185,214 B1 * | 2/2001 | Schwartz | H04L 12/5601 370/389 |
| 6,185,241 B1 | 2/2001 | Sun | |
| 6,331,983 B1 | 12/2001 | Haggerty | |
| 6,438,106 B1 | 8/2002 | Pillar | |
| 6,498,781 B1 | 12/2002 | Bass | |
| 6,542,266 B1 | 4/2003 | Philips | |
| 6,633,761 B1 | 10/2003 | Singhal | |
| 6,771,610 B1 | 8/2004 | Seaman | |
| 6,873,602 B1 | 3/2005 | Ambe | |
| 6,937,576 B1 | 8/2005 | DiBenedetto | |
| 6,956,824 B2 * | 10/2005 | Mark | H04L 12/2852 370/242 |
| 6,957,269 B2 * | 10/2005 | Williams | H04L 12/5602 370/230 |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,097,308 B2 | 8/2006 | Kim et al. | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 * | 1/2008 | Griffith | H04L 63/1408 709/223 |
| 7,330,897 B2 | 2/2008 | Baldwin | |
| 7,380,025 B1 | 5/2008 | Riggins | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser, Jr. | |
| 7,571,447 B2 | 8/2009 | Ally | |
| 7,559,990 B2 | 10/2009 | Mital | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 | 8/2010 | Mehta | |
| 7,792,920 B2 | 9/2010 | Istvan | |
| 7,796,593 B1 | 9/2010 | Ghosh | |
| 7,808,992 B2 | 10/2010 | Homechaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,912,091 B1 | 3/2011 | Krishnan | |
| 7,924,837 B1 | 4/2011 | Shabtay | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,035 B2 | 9/2011 | Portolani | |
| 8,027,354 B1 | 9/2011 | Portolani | |
| 8,054,832 B1 | 11/2011 | Shukla | |
| 8,068,442 B1 * | 11/2011 | Kompella | H04L 12/462 370/256 |
| 8,078,704 B2 | 12/2011 | Lee | |
| 8,102,781 B2 | 1/2012 | Smith | |
| 8,102,791 B2 | 1/2012 | Smith | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,175,107 B1 | 5/2012 | Yalagandula | |
| 8,095,774 B1 | 6/2012 | Lambeth | |
| 8,194,674 B1 | 6/2012 | Pagel | |
| 8,195,774 B2 | 6/2012 | Lambeth | |
| 8,204,061 B1 * | 6/2012 | Sane | H04L 49/557 370/256 |
| 8,213,313 B1 | 7/2012 | Doiron | |
| 8,213,336 B2 | 7/2012 | Smith | |
| 8,230,069 B2 | 7/2012 | Korupolu | |
| 8,124,906 B2 | 8/2012 | Raman | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake, III | |
| 8,369,335 B2 | 2/2013 | Jha | |
| 8,369,347 B2 | 2/2013 | Xiong | |
| 8,392,496 B2 | 3/2013 | Linden | |
| 8,462,774 B2 | 6/2013 | Page | |
| 8,465,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 * | 12/2013 | Natarajan | H04L 43/026 370/389 |
| 8,706,905 B1 | 4/2014 | McGlaughlin | |
| 8,724,456 B1 | 5/2014 | Hong | |
| 8,806,031 B1 | 8/2014 | Kondur | |
| 8,826,385 B2 | 9/2014 | Congdon | |
| 8,918,631 B1 | 12/2014 | Kumar | |
| 8,937,865 B1 | 1/2015 | Kumar | |
| 8,995,272 B2 | 3/2015 | Agarwal | |
| 2001/0005527 A1 | 6/2001 | Vaeth | |
| 2001/0055274 A1 * | 12/2001 | Hegge | H04L 43/026 370/229 |
| 2002/0019904 A1 | 2/2002 | Katz | |
| 2002/0021701 A1 | 2/2002 | Lavian | |
| 2002/0039350 A1 | 4/2002 | Wang | |
| 2002/0054593 A1 | 5/2002 | Morohashi | |
| 2002/0091795 A1 | 6/2002 | Yip | |
| 2003/0041085 A1 | 2/2003 | Sato | |
| 2003/0123393 A1 | 7/2003 | Feuerstraeter | |
| 2003/0147385 A1 | 8/2003 | Montalvo | |
| 2003/0174706 A1 | 9/2003 | Shankar | |
| 2003/0189905 A1 | 10/2003 | Lee | |
| 2003/0208616 A1 | 11/2003 | Laing | |
| 2003/0216143 A1 | 11/2003 | Roese | |
| 2004/0001433 A1 | 1/2004 | Gram | |
| 2004/0003094 A1 | 1/2004 | See | |
| 2004/0010600 A1 | 1/2004 | Baldwin | |

(56) References Cited

U.S. PATENT DOCUMENTS

| | | | |
|---|---|---|---|
| 2004/0049699 A1* | 3/2004 | Griffith | H04L 63/1408 726/23 |
| 2004/0057430 A1 | 3/2004 | Paavolainen | |
| 2004/0081171 A1 | 4/2004 | Finn | |
| 2004/0117508 A1 | 6/2004 | Shimizu | |
| 2004/0120326 A1 | 6/2004 | Yoon | |
| 2004/0156313 A1 | 8/2004 | Hofmeister et al. | |
| 2004/0165595 A1 | 8/2004 | Holmgren | |
| 2004/0165596 A1 | 8/2004 | Holmgren | |
| 2004/0205234 A1 | 10/2004 | Barrack | |
| 2004/0213232 A1 | 10/2004 | Regan | |
| 2005/0007951 A1 | 1/2005 | Lapuh | |
| 2005/0044199 A1 | 2/2005 | Shiga | |
| 2005/0074001 A1 | 4/2005 | Mattes | |
| 2005/0094568 A1 | 5/2005 | Judd | |
| 2005/0094630 A1 | 5/2005 | Valdevit | |
| 2005/0122979 A1 | 6/2005 | Gross | |
| 2005/0157645 A1 | 7/2005 | Rabie et al. | |
| 2005/0157751 A1* | 7/2005 | Rabie | H04L 12/56 370/466 |
| 2005/0169188 A1 | 8/2005 | Cometto | |
| 2005/0195813 A1 | 9/2005 | Ambe | |
| 2005/0207423 A1 | 9/2005 | Herbst | |
| 2005/0213561 A1 | 9/2005 | Yao | |
| 2005/0220096 A1 | 10/2005 | Friskney | |
| 2005/0265356 A1 | 12/2005 | Kawarai | |
| 2005/0278565 A1 | 12/2005 | Frattura | |
| 2006/0007869 A1 | 1/2006 | Hirota | |
| 2006/0018302 A1 | 1/2006 | Ivaldi | |
| 2006/0023707 A1 | 2/2006 | Makishima et al. | |
| 2006/0029055 A1 | 2/2006 | Perera | |
| 2006/0034292 A1* | 2/2006 | Wakayama | H04L 45/00 370/395.5 |
| 2006/0036765 A1 | 2/2006 | Weyman | |
| 2006/0059163 A1 | 3/2006 | Frattura | |
| 2006/0062187 A1 | 3/2006 | Rune | |
| 2006/0072550 A1 | 4/2006 | Davis | |
| 2006/0083254 A1 | 4/2006 | Ge | |
| 2006/0093254 A1 | 4/2006 | Ge | |
| 2006/0098589 A1 | 5/2006 | Kreeger | |
| 2006/0140130 A1 | 6/2006 | Kalkunte | |
| 2006/0168109 A1* | 7/2006 | Warmenhoven | H04L 41/0893 709/218 |
| 2006/0184937 A1 | 8/2006 | Abels | |
| 2006/0221960 A1 | 10/2006 | Borgione | |
| 2006/0227776 A1 | 10/2006 | Chandrasekaran | |
| 2006/0235995 A1 | 10/2006 | Bhatia | |
| 2006/0242311 A1 | 10/2006 | Mai | |
| 2006/0245439 A1* | 11/2006 | Sajassi | H04L 12/2881 370/400 |
| 2006/0251067 A1 | 11/2006 | Desanti | |
| 2006/0256767 A1 | 11/2006 | Suzuki | |
| 2006/0265515 A1 | 11/2006 | Shiga | |
| 2006/0285499 A1 | 12/2006 | Tzeng | |
| 2006/0291388 A1 | 12/2006 | Amdahl | |
| 2006/0291480 A1 | 12/2006 | Cho | |
| 2007/0036178 A1 | 2/2007 | Hares | |
| 2007/0053294 A1 | 3/2007 | Ho | |
| 2007/0081530 A1* | 4/2007 | Nomura | H04L 12/185 370/389 |
| 2007/0083625 A1 | 4/2007 | Chamdani | |
| 2007/0086362 A1* | 4/2007 | Kato | H04L 41/00 370/254 |
| 2007/0094464 A1* | 4/2007 | Sharma | G06F 11/2064 711/162 |
| 2007/0097968 A1 | 5/2007 | Du | |
| 2007/0098006 A1 | 5/2007 | Parry | |
| 2007/0116224 A1 | 5/2007 | Burke | |
| 2007/0116422 A1 | 5/2007 | Reynolds | |
| 2007/0156659 A1 | 7/2007 | Lim | |
| 2007/0177525 A1 | 8/2007 | Wijnands | |
| 2007/0177597 A1 | 8/2007 | Ju | |
| 2007/0183313 A1* | 8/2007 | Narayanan | H04L 49/357 370/216 |
| 2007/0211712 A1* | 9/2007 | Fitch | H04L 49/358 370/388 |
| 2007/0258449 A1 | 11/2007 | Bennett | |
| 2007/0274234 A1 | 11/2007 | Kubota | |
| 2007/0289017 A1 | 12/2007 | Copeland, III | |
| 2008/0052487 A1 | 2/2008 | Akahane | |
| 2008/0056135 A1 | 3/2008 | Lee | |
| 2008/0065760 A1 | 3/2008 | Damm | |
| 2008/0080517 A1 | 4/2008 | Roy | |
| 2008/0095160 A1 | 4/2008 | Yadav | |
| 2008/0101386 A1 | 5/2008 | Gray | |
| 2008/0112400 A1 | 5/2008 | Dunbar et al. | |
| 2008/0133760 A1 | 6/2008 | Henricus | |
| 2008/0159277 A1 | 7/2008 | Vobbilisetty | |
| 2008/0172492 A1 | 7/2008 | Raghunath | |
| 2008/0181196 A1 | 7/2008 | Regan | |
| 2008/0181243 A1 | 7/2008 | Vobbilisetty | |
| 2008/0186981 A1 | 8/2008 | Seto | |
| 2008/0205377 A1 | 8/2008 | Chao | |
| 2008/0219172 A1 | 9/2008 | Mohan | |
| 2008/0225852 A1 | 9/2008 | Melman | |
| 2008/0225853 A1 | 9/2008 | Melman | |
| 2008/0228897 A1 | 9/2008 | Ko | |
| 2008/0240129 A1 | 10/2008 | Elmeleegy | |
| 2008/0267179 A1 | 10/2008 | Lavigne | |
| 2008/0285458 A1 | 11/2008 | Lysne | |
| 2008/0285555 A1 | 11/2008 | Ogasahara | |
| 2008/0298248 A1 | 12/2008 | Roeck | |
| 2008/0304498 A1 | 12/2008 | Jorgensen | |
| 2008/0310342 A1* | 12/2008 | Kruys | H04L 45/34 370/328 |
| 2009/0022069 A1 | 1/2009 | Khan | |
| 2009/0037607 A1 | 2/2009 | Farinacci | |
| 2009/0042270 A1 | 2/2009 | Shelly | |
| 2009/0044270 A1 | 2/2009 | Shelly | |
| 2009/0067422 A1 | 3/2009 | Poppe | |
| 2009/0067442 A1* | 3/2009 | Killian | H04L 12/467 370/401 |
| 2009/0079560 A1 | 3/2009 | Fries | |
| 2009/0080345 A1 | 3/2009 | Gray | |
| 2009/0083445 A1 | 3/2009 | Ganga | |
| 2009/0092042 A1 | 4/2009 | Yuhara | |
| 2009/0092043 A1 | 4/2009 | Lapuh | |
| 2009/0106405 A1 | 4/2009 | Mazarick | |
| 2009/0116381 A1 | 5/2009 | Kanda | |
| 2009/0129384 A1* | 5/2009 | Regan | H04L 12/4641 370/390 |
| 2009/0138577 A1 | 5/2009 | Casado | |
| 2009/0138752 A1 | 5/2009 | Graham | |
| 2009/0161584 A1 | 6/2009 | Guan | |
| 2009/0161670 A1* | 6/2009 | Shepherd | H04L 12/185 370/389 |
| 2009/0168647 A1* | 7/2009 | Holness | H04L 12/437 370/228 |
| 2009/0199177 A1 | 8/2009 | Edwards | |
| 2009/0204965 A1 | 8/2009 | Tanaka | |
| 2009/0213783 A1* | 8/2009 | Moreton | H04W 36/24 370/328 |
| 2009/0222879 A1 | 9/2009 | Kostal | |
| 2009/0232031 A1 | 9/2009 | Vasseur | |
| 2009/0245137 A1 | 10/2009 | Hares | |
| 2009/0245242 A1 | 10/2009 | Carlson | |
| 2009/0246137 A1 | 10/2009 | Hares | |
| 2009/0252049 A1* | 10/2009 | Ludwig | H04W 28/24 370/252 |
| 2009/0252061 A1 | 10/2009 | Small | |
| 2009/0260083 A1 | 10/2009 | Szeto | |
| 2009/0279558 A1* | 11/2009 | Davis | H04L 45/00 370/412 |
| 2009/0292858 A1* | 11/2009 | Lambeth | H04L 29/12839 711/6 |
| 2009/0316721 A1 | 12/2009 | Kanda | |
| 2009/0323698 A1 | 12/2009 | LeFaucheur | |
| 2009/0323708 A1 | 12/2009 | Ihle | |
| 2009/0327392 A1* | 12/2009 | Tripathi | G06F 15/16 709/201 |
| 2009/0327462 A1 | 12/2009 | Adams | |

(56) References Cited

U.S. PATENT DOCUMENTS

| | | | |
|---|---|---|---|
| 2010/0027420 A1* | 2/2010 | Smith | G06F 9/4856 370/235 |
| 2010/0046471 A1 | 2/2010 | Hattori | |
| 2010/0054260 A1 | 3/2010 | Pandey | |
| 2010/0061269 A1 | 3/2010 | Banerjee | |
| 2010/0074175 A1 | 3/2010 | Banks | |
| 2010/0097941 A1 | 4/2010 | Carlson | |
| 2010/0103813 A1 | 4/2010 | Allan | |
| 2010/0103939 A1 | 4/2010 | Carlson | |
| 2010/0131636 A1 | 5/2010 | Suri | |
| 2010/0158024 A1 | 6/2010 | Sajassi | |
| 2010/0165877 A1 | 7/2010 | Shukla | |
| 2010/0165995 A1 | 7/2010 | Mehta | |
| 2010/0168467 A1 | 7/2010 | Shukla | |
| 2010/0169467 A1 | 7/2010 | Shukla | |
| 2010/0169948 A1 | 7/2010 | Budko | |
| 2010/0182920 A1* | 7/2010 | Matsuoka | H04L 43/00 370/252 |
| 2010/0195489 A1 | 8/2010 | Zhou | |
| 2010/0215042 A1 | 8/2010 | Sato | |
| 2010/0215049 A1 | 8/2010 | Raza | |
| 2010/0220724 A1* | 9/2010 | Rabie | H04L 47/10 370/392 |
| 2010/0226368 A1 | 9/2010 | Mack-Crane | |
| 2010/0226381 A1 | 9/2010 | Mehta | |
| 2010/0246388 A1 | 9/2010 | Gupta | |
| 2010/0257263 A1 | 10/2010 | Casado | |
| 2010/0265849 A1 | 10/2010 | Harel | |
| 2010/0271960 A1 | 10/2010 | Krygowski | |
| 2010/0272107 A1 | 10/2010 | Papp | |
| 2010/0281106 A1 | 11/2010 | Ashwood-Smith | |
| 2010/0284414 A1 | 11/2010 | Agarwal | |
| 2010/0284418 A1 | 11/2010 | Gray | |
| 2010/0287262 A1 | 11/2010 | Elzur | |
| 2010/0287548 A1 | 11/2010 | Zhou | |
| 2010/0290473 A1 | 11/2010 | Enduri | |
| 2010/0299527 A1 | 11/2010 | Arunan | |
| 2010/0303071 A1 | 12/2010 | Kotalwar | |
| 2010/0303075 A1 | 12/2010 | Tripathi | |
| 2010/0303083 A1 | 12/2010 | Belanger | |
| 2010/0309820 A1 | 12/2010 | Rajagopalan | |
| 2010/0309912 A1 | 12/2010 | Mehta | |
| 2010/0329110 A1 | 12/2010 | Rose | |
| 2011/0019678 A1 | 1/2011 | Mehta | |
| 2011/0032945 A1 | 2/2011 | Mullooly | |
| 2011/0035489 A1 | 2/2011 | McDaniel | |
| 2011/0035498 A1 | 2/2011 | Shah | |
| 2011/0044339 A1 | 2/2011 | Kotalwar | |
| 2011/0044352 A1 | 2/2011 | Chaitou | |
| 2011/0064086 A1 | 3/2011 | Xiong | |
| 2011/0064089 A1 | 3/2011 | Hidaka | |
| 2011/0072208 A1 | 3/2011 | Gulati | |
| 2011/0085560 A1 | 4/2011 | Chawla | |
| 2011/0085563 A1 | 4/2011 | Kotha | |
| 2011/0110266 A1* | 5/2011 | Li | H04L 47/2491 370/253 |
| 2011/0134802 A1 | 6/2011 | Rajagopalan | |
| 2011/0134803 A1* | 6/2011 | Dalvi | H04L 12/462 370/256 |
| 2011/0134925 A1 | 6/2011 | Safrai | |
| 2011/0142053 A1 | 6/2011 | Merwe | |
| 2011/0142062 A1 | 6/2011 | Wang | |
| 2011/0161494 A1* | 6/2011 | Mcdysan | H04L 45/306 709/225 |
| 2011/0161695 A1 | 6/2011 | Okita | |
| 2011/0176412 A1 | 7/2011 | Stine | |
| 2011/0188373 A1* | 8/2011 | Saito | H04L 1/24 370/230 |
| 2011/0194403 A1 | 8/2011 | Sajassi | |
| 2011/0194563 A1 | 8/2011 | Shen | |
| 2011/0228780 A1 | 9/2011 | Ashwood-Smith | |
| 2011/0231570 A1 | 9/2011 | Altekar | |
| 2011/0231574 A1 | 9/2011 | Saunderson | |
| 2011/0235523 A1 | 9/2011 | Jha | |
| 2011/0243133 A9 | 10/2011 | Villait | |
| 2011/0243136 A1 | 10/2011 | Raman | |
| 2011/0246669 A1 | 10/2011 | Kanada | |
| 2011/0255538 A1 | 10/2011 | Srinivasan | |
| 2011/0255540 A1 | 10/2011 | Mizrahi | |
| 2011/0261828 A1 | 10/2011 | Smith | |
| 2011/0268120 A1 | 11/2011 | Vobbilisetty | |
| 2011/0268125 A1 | 11/2011 | Vobbilisetty | |
| 2011/0273988 A1 | 11/2011 | Tourrilhes | |
| 2011/0274114 A1 | 11/2011 | Dhar | |
| 2011/0280572 A1 | 11/2011 | Vobbilisetty | |
| 2011/0286457 A1 | 11/2011 | Ee | |
| 2011/0055274 A1 | 12/2011 | Hegge | |
| 2011/0296052 A1 | 12/2011 | Guo | |
| 2011/0299391 A1 | 12/2011 | Vobbilisetty | |
| 2011/0299413 A1 | 12/2011 | Chatwani | |
| 2011/0299414 A1 | 12/2011 | Yu | |
| 2011/0299527 A1 | 12/2011 | Yu | |
| 2011/0299528 A1 | 12/2011 | Yu | |
| 2011/0299531 A1 | 12/2011 | Yu | |
| 2011/0299532 A1 | 12/2011 | Yu | |
| 2011/0299533 A1 | 12/2011 | Yu | |
| 2011/0299534 A1* | 12/2011 | Koganti | H04L 12/4625 370/392 |
| 2011/0299535 A1* | 12/2011 | Vobbilisetty | H04L 12/4625 370/392 |
| 2011/0299536 A1 | 12/2011 | Cheng | |
| 2011/0317559 A1 | 12/2011 | Kern | |
| 2011/0317703 A1 | 12/2011 | Dunbar et al. | |
| 2012/0011240 A1 | 1/2012 | Hara | |
| 2012/0014261 A1 | 1/2012 | Salam | |
| 2012/0014387 A1 | 1/2012 | Dunbar | |
| 2012/0020220 A1 | 1/2012 | Sugita | |
| 2012/0027017 A1 | 2/2012 | Rai | |
| 2012/0033663 A1 | 2/2012 | Guichard | |
| 2012/0033665 A1 | 2/2012 | Jacob Da Silva et al. | |
| 2012/0033668 A1 | 2/2012 | Humphries | |
| 2012/0033669 A1* | 2/2012 | Mohandas | H04L 45/245 370/392 |
| 2012/0033672 A1 | 2/2012 | Page | |
| 2012/0063363 A1 | 3/2012 | Li | |
| 2012/0075991 A1 | 3/2012 | Sugita | |
| 2012/0099567 A1 | 4/2012 | Hart | |
| 2012/0099602 A1 | 4/2012 | Nagapudi | |
| 2012/0106339 A1 | 5/2012 | Mishra | |
| 2012/0117438 A1 | 5/2012 | Shaffer | |
| 2012/0131097 A1 | 5/2012 | Baykal | |
| 2012/0131289 A1 | 5/2012 | Taguchi | |
| 2012/0134266 A1 | 5/2012 | Roitshtein | |
| 2012/0147740 A1 | 6/2012 | Nakash | |
| 2012/0158997 A1 | 6/2012 | Hsu | |
| 2012/0163164 A1 | 6/2012 | Terry | |
| 2012/0177039 A1 | 7/2012 | Berman | |
| 2012/0210416 A1 | 8/2012 | Mihelich | |
| 2012/0243359 A1 | 9/2012 | Keesara | |
| 2012/0243539 A1 | 9/2012 | Keesara | |
| 2012/0275297 A1 | 11/2012 | Subramanian | |
| 2012/0275347 A1* | 11/2012 | Banerjee | H04L 12/4675 370/256 |
| 2012/0278804 A1 | 11/2012 | Narayanasamy | |
| 2012/0294192 A1 | 11/2012 | Masood | |
| 2012/0294194 A1* | 11/2012 | Balasubramanian | H04L 12/4641 370/256 |
| 2012/0230800 A1 | 12/2012 | Kamble | |
| 2012/0320800 A1 | 12/2012 | Kamble | |
| 2012/0320926 A1 | 12/2012 | Kamath et al. | |
| 2012/0327766 A1 | 12/2012 | Tsai et al. | |
| 2012/0327937 A1 | 12/2012 | Melman et al. | |
| 2013/0003535 A1 | 1/2013 | Sarwar | |
| 2013/0003737 A1 | 1/2013 | Sinicrope | |
| 2013/0003738 A1 | 1/2013 | Koganti | |
| 2013/0028072 A1* | 1/2013 | Addanki | H04L 41/0659 370/218 |
| 2013/0034015 A1 | 2/2013 | Jaiswal | |
| 2013/0034021 A1 | 2/2013 | Jaiswal | |
| 2013/0067466 A1 | 3/2013 | Combs | |
| 2013/0070762 A1 | 3/2013 | Adams | |
| 2013/0114595 A1 | 5/2013 | Mack-Crane et al. | |

(56) References Cited

U.S. PATENT DOCUMENTS

| | | | |
|---|---|---|---|
| 2013/0124707 A1 | 5/2013 | Ananthapadmanabha | |
| 2013/0127848 A1* | 5/2013 | Joshi | G06T 17/20 345/420 |
| 2013/0136123 A1 | 5/2013 | Ge | |
| 2013/0148546 A1 | 6/2013 | Eisenhauer | |
| 2013/0194914 A1* | 8/2013 | Agarwal | H04L 45/245 370/225 |
| 2013/0219473 A1 | 8/2013 | Schaefer | |
| 2013/0250951 A1* | 9/2013 | Koganti | H04L 49/356 370/390 |
| 2013/0259037 A1 | 10/2013 | Natarajan | |
| 2013/0272135 A1 | 10/2013 | Leong | |
| 2013/0294451 A1 | 11/2013 | Li | |
| 2013/0301642 A1 | 11/2013 | Radhakrishnan | |
| 2013/0346583 A1 | 12/2013 | Low | |
| 2014/0013324 A1 | 1/2014 | Zhang | |
| 2014/0025736 A1 | 1/2014 | Wang | |
| 2014/0044126 A1 | 2/2014 | Sabhanatarajan | |
| 2014/0056298 A1 | 2/2014 | Vobbilisetty | |
| 2014/0105034 A1 | 4/2014 | Huawei | |
| 2015/0010007 A1 | 1/2015 | Matsuhira | |
| 2015/0030031 A1 | 1/2015 | Zhou | |
| 2015/0143369 A1 | 5/2015 | Zheng | |

FOREIGN PATENT DOCUMENTS

| | | | |
|---|---|---|---|
| EP | 0579567 A2 | 1/1994 | |
| EP | 0993156 A2 | 12/2000 | |
| EP | 1398920 A2 | 3/2004 | |
| EP | 1916807 A2 | 4/2008 | |
| EP | 2001167 A1 | 12/2008 | |
| WO | 2008056838 | 5/2008 | |
| WO | 2009042919 | 4/2009 | |
| WO | 2010111142 A1 | 9/2010 | |
| WO | 2014031781 | 2/2014 | |

OTHER PUBLICATIONS

Office Action for U.S. Appl. No. 13/351,513, filed Jan. 17, 2012, dated Feb. 28, 2014.
Office Action for U.S. Appl. No. 13/425,238, filed Mar. 20, 2012, dated Mar. 6, 2014.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/194,526, filed Jul. 16, 2011, dated Dec. 2, 2013.
Office Action for U.S. Appl. No. 13/092,460, filed Apr. 22, 2011, dated Mar. 14, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
Louati, Wajdi et al., "Network-Based Virtual Personal Overlay Networks Using Programmable Virtual Routers", 2005.
Knight, Paul et al., "Network based IP VPN Architecture using Virtual Routers", May 2003.
Kreeger, L. et al. "Network Virtualization Overlay Control Protocol Requirements draft-kreeger-nvo3-overlay-cp-00", Aug. 2, 2012.
An Introduction to Brocade VCS Fabric Technology, Dec. 3, 2012.
Knight, Paul et al. "Layer 2 and 3 Virtual Private Networks: Taxonomy, Technology, and Standardization Efforts", 2004.
Narten, T. et al. "Problem Statement: Overlays for Network Virtualization draft-narten-nvo3-overlay-problem-statement-01", Oct. 31, 2011.
The Effortless Network: HyperEdge Technology for the Campus LAN, 2012.
FastIron and TurbuIron 24x Configuration Guide, 2010.
FastIron Configuration Guide, Supporting IronWare Software Release 07.0.00, 2009.
Foundary FastIron Configuration Guide, Software Release FSX 04.2.00b, Software Release FWS 04.3.00, Software Release FGS 05.0.00a, 2008.
Brocade Unveils "The Effortless Network", 2009.
Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated Dec. 5, 2012.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/184,526, filed Jul. 16, 2011, dated Jan. 28, 2013.

(56) References Cited

OTHER PUBLICATIONS

Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Feb. 3, 2012, dated Jul. 18, 2013.
Office Action for U.S. Appl. No. 13/312,903, filed Dec. 6, 2011, dated Jun. 13, 2013.
Office Action for U.S. Appl. No. 13/598,204, filed Aug. 29, 2012, dated Feb. 20, 2014.
Christensen, M. et al., "Considerations for Internet Group Management Protocol (IGMP) and Multicast Listener Discovery (MLD) Snooping Switches", May 2006.
Perlman, Radia et al., "RBridges: Base Protocol Specification", <draft-ietf-trill-rbridge-protocol-16.txt> Mar. 2010.
Brocade Fabric OS (FOS) 6.2 Virtual Fabrics Feature Frequently Asked Questions, 2008.
Eastlake III, Doanld et al., "RBridges: TRILL Header Options" <draft-ietf-trill-rbridge-options-00.txt>, Dec. 2009.
Perlman, Radia "Challenges and Opportunities in the Design of TRILL: a Routed layer 2 Technology", 2009.
Perlman, Radia et al., "RBridge VLAN Mapping" <draft-ietf-trill-rbridge-vlan-mapping-01.txt>, Dec. 2009.
Knight, S. et al., "Virtual Router Redundancy Protocol", Apr. 1998.
"Switched Virtual Internetworking Moves Beyond Bridges and Routers", 8178 Data Communications Sep. 23, 1994, No. 12.
Touch, J. et al. "Transparent Interconnection of Lots of Links (TRILL): Problem and Applicability Statement", May 2009.
Lapuh, Roger et al., "Split Multi-link Trunking (SMLT)", Oct. 2002.
Lapuh, Roger et al., "Split Multi-link Trunking (SMLT) draft-lapuh-network-smlt-08", Jan. 2009.
S. Nadas et al., "Virtual Router Redundancy Protocol (VRRP) Version 3 for IPv4 and IPv6", Mar. 2010.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.

(56) References Cited

OTHER PUBLICATIONS

Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
Brocade 'Brocade Unveils' The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/365,993, filed Feb. 3, 2012, from Cho, Hong Sol., dated Jul. 23, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
Office Action for U.S. Appl. No. 13/098,490, filed May 2, 2011, dated Mar. 27, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office action dated Jun. 8, 2015, U.S. Appl. No. 14/178,042, filed Feb. 11, 2014.
Office Action dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.

(56) References Cited

OTHER PUBLICATIONS

Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.

* cited by examiner

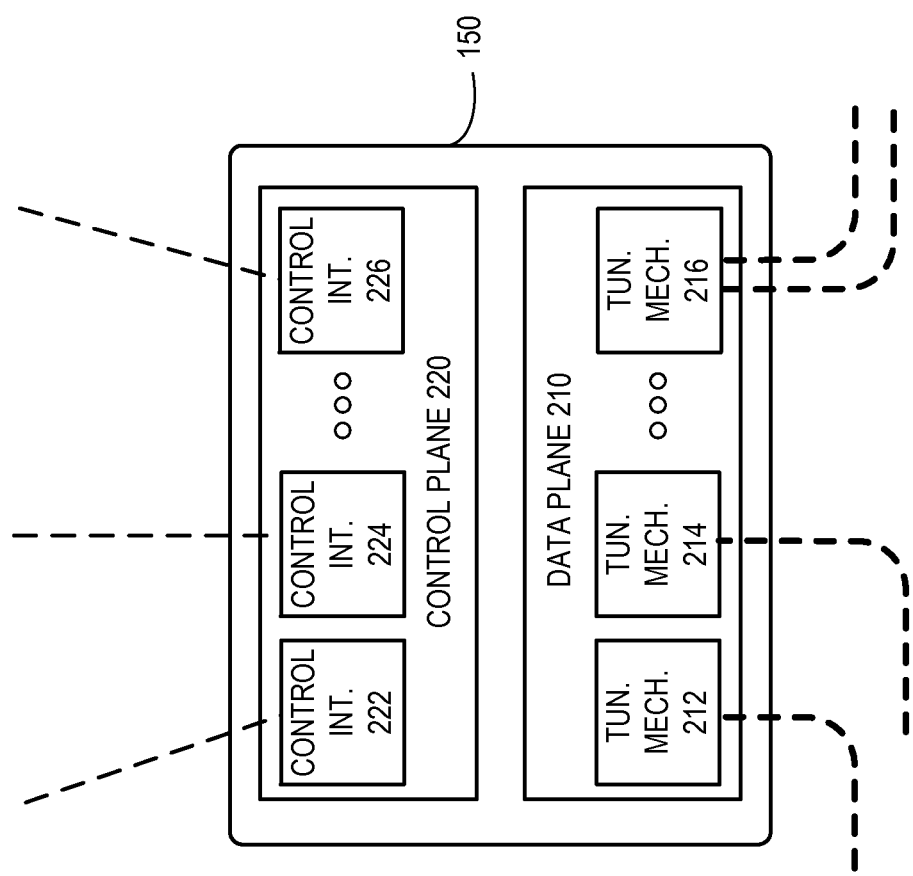

LAYER-3 OVERLAY GATEWAYS

RELATED APPLICATIONS

This application claims the benefit of U.S. Provisional Application No. 61/650,943, titled "L3 Overlay Gateways," by inventor Mani Prasad Kancherla, filed 23 May 2012, the disclosure of which is incorporated by reference herein.

The present disclosure is related to:

U.S. Patent Publication No. 2010/0246388, titled "Redundant Host Connection in a Routed Network," by inventors Somesh Gupta, Anoop Ghanwani, Phanidhar Koganti, and Shunjia Yu, filed 16 Mar. 2010; and U.S. patent application Ser. No. 13/801,858, titled "Overlay Tunnel in a Fabric Switch," by inventor Phanidhar Koganti, filed 13 Mar. 2013;

the disclosures of which are incorporated by reference herein.

BACKGROUND

Field

The present disclosure relates to network management. More specifically, the present disclosure relates to layer-3 overlays in a network.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as awareness of virtual machine migration, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

As Internet traffic is becoming more diverse, virtual computing in a network is becoming progressively more important as a value proposition for network architects. The evolution of virtual computing has placed additional requirements on the network. However, conventional layer-2 network architecture often cannot readily accommodate the dynamic nature of virtual machines. For example, in conventional datacenter architecture, host machines can be inter-connected by layer-2 (e.g., Ethernet) interconnects forming a layer-2 broadcast domain. Because of the physical reach limitation of a layer-2 broadcast domain, a datacenter is typically segmented into different layer-2 broadcast domains. Consequently, any communication to outside of a layer-2 broadcast domain is carried over layer-3 networks. As the locations of virtual machines become more mobile and dynamic, and data communication from the virtual machine becomes more diverse, it is often desirable that the network infrastructure can provide layer-3 network overlay tunnels to assist the data communication acrosslayer-2 broadcast domains.

While overlays bring many desirable features to a network, some issues remain unsolved in providing a logical subnet across layer-2 broadcast domains.

SUMMARY

One embodiment of the present invention provides a computing system. The computing system includes a processor and a computer-readable storage medium for storing instructions. Based on the instructions, the processor operates the computing system as an overlay gateway. The computing system initiates and terminates an overlay tunnel associated with a virtual machine. During operation, the computing system maps a virtual Internet Protocol (IP) address of the virtual machine to a second IP address used to terminate the overlay tunnel based on information received from a configuration system. The computing system then determines an output port for a data packet based on the second IP address. The data packet comprises an inner packet and the destination address of this inner packet corresponds to the virtual IP address.

In a variation on this embodiment, the mapping is also based on a virtual media access control (MAC) address corresponding to the virtual IP address.

In a variation on this embodiment, the computing system updates the mapping by mapping the virtual IP address of the virtual machine to a third IP address used to determine the output port for the data packet.

In a variation on this embodiment, the configuration system is one or more of: a virtualization controller, a network manager, and a shim device. The virtualization controller allocates the virtual machine to a hypervisor in a host machine and assigns the virtual IP addresses to the virtual machine. The network manager notifies the hypervisor regarding networking information. The shim device obtains networking information from the network manager.

In a further variation, the computing system also includes a shim control plane layer, which recognizes a plurality of virtualization controllers. A respective virtualization controller can correspond to a different virtualization mechanism.

In a variation on this embodiment, the computing system further comprises a shim data plane layer, which recognizes a plurality of overlay tunneling mechanisms.

In a further variation, a tunneling mechanism is associated with one or more of: a Virtual Extensible Local Area Network (VXLAN), a Generic Routing Encapsulation (GRE) protocol, a Network Virtualization using GRE (NVGRE) protocol, and an openvSwitch GRE protocol.

In a variation on this embodiment, the computing system identifies in a data packet a logical IP address associated with the computing system and a remote computing system, wherein the data packet is associated with the overlay tunnel.

In a further variation, the computing system determines an active status of the computing system in conjunction with the remote computing system. If the computing system is not active, the processor precludes the computing system from processing a packet associated with the logical IP address.

In a further variation, the computing system detects a failure of the remote computing system. Upon detecting the failure, the computing system starts processing a packet associated with the logical IP address.

In a further variation, the computing system identifies a tunnel termination IP address associated with the computing system and a remote computing system, wherein the data packet is associated with the overlay tunnel. This tunnel termination IP address belongs to a subnet different from a subnet to which the logical IP address belongs.

BRIEF DESCRIPTION OF THE FIGURES

FIG. 2 illustrates an exemplary overlay gateway supporting multiple control interfaces and tunneling mechanisms, in accordance with an embodiment of the present invention.

In the figures, like reference numerals refer to the same figure elements.

DETAILED DESCRIPTION

Figure 1A:
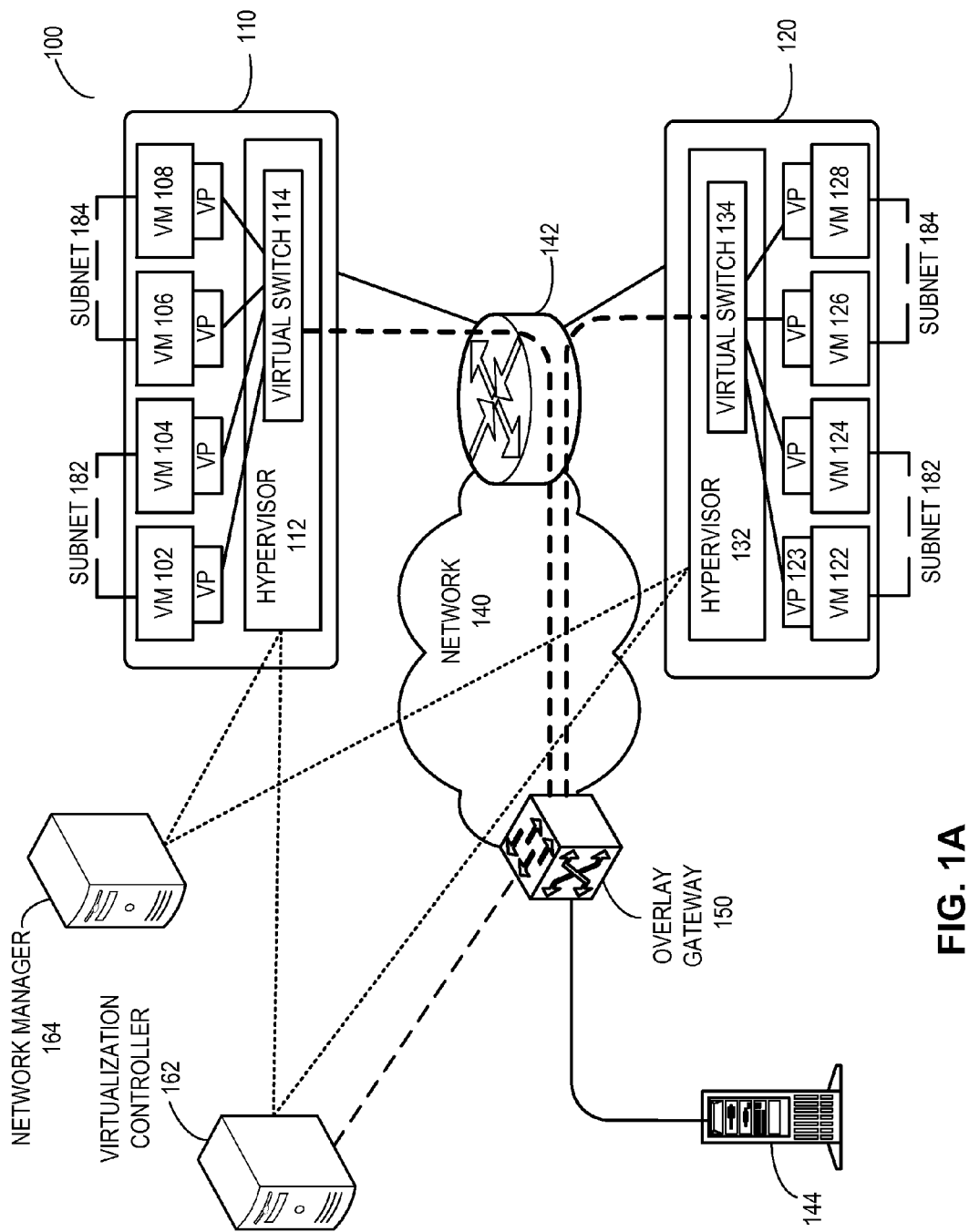
FIG. 1A illustrates an exemplary virtualized network environment with an overlay gateway, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating a logical sub network (subnet) beyond a physical subnet boundary is solved by incorporating an overlay gateway which provides virtual tunneling between physical subnets to form the logical subnet. This logical subnet logically couples the virtual machines belonging to the logical subnet but residing in host machines belonging to different physical subnets. In this way, the physical infrastructure of a network is often virtualized to accommodate multi-tenancy. One of the challenges in network virtualization is to bridge the physical network topology with the virtualized network subnet.

For example, a datacenter can include virtual machines associated with a customer (or tenant), running on hypervisors residing on different physical hosts. These virtual machines can be part of the same logical subnet. A virtualization controller of the datacenter typically allocates a respective virtual machine to a hypervisor in a host machine, and assigns the Media Access Control (MAC) and Internet Protocol (IP) addresses to the virtual machine. Typically, hypervisors or virtual switches use layer-3 virtual tunneling to allow virtual machines belonging to the same logical subnet to communicate. These hypervisors or virtual switches can be referred to as virtual tunnel end points (VTEPs). However, if the host machine of one of the virtual machines does not have the equivalent tunneling configuration, the other virtual machine may not be able to communicate via a virtual tunnel.

To solve this problem, an overlay gateway facilitates virtual tunneling to a respective VTEP (e.g., a hypervisor or a virtual switch) of a respective host machine. The overlay gateway, in turn, communicates with a destination, such as a physical server, which does not support the same tunneling mechanism. However, to associate the virtual tunnel with a virtual machine, the overlay gateway needs to identify a VTEP for the virtual machine. To facilitate this identification, the overlay gateway maintains a tunnel mapping between the MAC address of a virtual machine, and the corresponding VTEP address. Note that the tunnel mapping can also include the mapping between the MAC address and the IP address of the virtual machine.

In some embodiments, the overlay gateway communicates with the virtualization controller and obtains the tunnel mapping for a respective virtual machine. Whenever the mapping is updated, the overlay gateway obtains the updated mapping from the virtualization controller. In some embodiments, the overlay gateway can include two "shim layers." A shim layer operates as a communication interface between two devices. One shim layer operates as the control plane and interfaces with the virtualization controller for obtaining the mapping. The other shim layer operates as the data plane and facilitates tunnel encapsulation of packets to and from the virtual machines. As a result, the same overlay gateway can support multiple overlay networks comprising multiple virtualization and tunneling mechanisms.

In some embodiments, the interconnection in the datacenter includes an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to an external device. In some further embodiments, the fabric switch is a Transparent Interconnection of Lots of Links (TRILL) network and a respective member switch of the fabric switch is a TRILL routing bridge (RBridge).

The term "external device" can refer to any device to which a VTEP cannot directly establish a tunnel. An external device can be a host, a server, a conventional layer-2 switch, a layer-3 router, or any other type of physical or virtual device. Additionally, an external device can be coupled to other switches or hosts further away from a network. An external device can also be an aggregation point for a number of network devices to enter the network. The terms "device" and "machine" are used interchangeably.

The term "hypervisor" is used in a generic sense, and can refer to any virtual machine manager. Any software, firmware, or hardware that creates and runs virtual machines can be a "hypervisor." The term "virtual machine" also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for any networking layer, sub-layer, or a combination of networking layers.

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "switch identifier" refers to a group of bits that can be used to identify a switch. If the switch is an RBridge, the switch identifier can be an "RBridge identifier." The TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is used in a generic sense, is not limited to any bit format, and can refer to "RBridge ID," "RBridge nickname," or any other format that can identify an RBridge.

Network Architecture

FIG. 1A illustrates an exemplary virtualized network environment with an overlay gateway, in accordance with an embodiment of the present invention. As illustrated in FIG. 1A, a virtualized network environment 100, which can be in a datacenter, includes a number of host machines 110 and 120 coupled to a layer-3 router 142 in network 140 via one or more hops. A number of virtual machines 102, 104, 106, and 108 run on hypervisor 112 in host machine 110. A respective virtual machine has a virtual port (VP, or virtual network interface card, VNIC). The virtual port of a respective virtual machine running on hypervisor 112 is logically coupled to a virtual switch 114, which is provided by hypervisor 112. Virtual switch 114 is responsible for dispatching outgoing and incoming traffic of virtual machines 102, 104, 106, and 108. Similarly, a number of virtual machines 122, 124, 126, and 128 run on hypervisor 132 in host machine 120. The virtual port of a respective virtual machine running on hypervisor 132 is logically coupled to a virtual switch 134 which is provided by a hypervisor 132. Logically, virtual switches 114 and 134 function as aggregation points and couple router 142 via one or more links.

Also included are a virtualization controller 162 and a network manager 164. Virtualization controller 162, often based on an instruction from a network administrator, allocates a respective virtual machine to a hypervisor in a host machine, and assigns virtual MAC and IP addresses to the virtual machine. For example, virtualization controller 162 allocates virtual machine 122 to hypervisor 132 in host machine 120, and assigns virtual MAC and IP addresses to virtual port 123 of virtual machine 122. An Ethernet frame generated by virtual machine 122 has the virtual MAC of virtual port 123 as its source address. In this example, host machines 110 and 120 are parts of two different physical subnets in network 140. However, virtual machines 102 and 104 in host machine 110 and virtual machines 122 and 124 in host machine 120 are part of logical subnet 182. Similarly, virtual machines 106 and 108 in host machine 110 and virtual machines 126 and 128 in host machine 120 are part of the same logical subnet 184. Usually a logical subnet corresponds to a tenant.

In some embodiments, virtual switches 114 and 134 are logically coupled to network manager 164, which provides virtual switches 114 and 134 with networking information required to communicate with each other. For example, because virtual machines 102 and 122 are part of the same logical subnet, virtual machine 102 can communicate with virtual machine 122 via layer-2. However, these virtual machines reside on host machines in different physical subnets. Hence, virtual switch 114 needs to know that virtual machine 122 is logically coupled to virtual switch 134 (e.g., virtual switch 134 is the VTEP for virtual machine 122). By providing this networking information, network manager 164 enable virtual switches 114 and 134 to operate as VTEPs for virtual machines 102 and 122, respectively, and use layer-3 virtual tunneling to facilitate communication between these virtual machines. However, because an external device, such as physical server 144, may not have the equivalent tunneling configuration, a virtual machine, such virtual machine 122, may not be able to communicate with server 144 via a virtual tunnel.

In order to communicate with server 144, an overlay gateway 150 allows a respective VTEP to establish virtual tunneling via network 140. Overlay gateway 150, in turn, communicates with physical server 144. During operation, virtual machine 122 sends a packet to virtual server 144 via logically coupled virtual switch 134. Virtual switch 134 encapsulates the packet in a tunnel header and forwards the encapsulated packet to gateway 150. Upon receiving the encapsulated packet, overlay gateway 150 removes the tunnel encapsulation and forwards the packet to server 144 based on the destination address of the packet. When server 144 sends a packet back to virtual machine 122, overlay gateway 150 receives the packet. However, to efficiently forward this packet to virtual machine 122, overlay gateway 150 needs to identify the virtual switch (i.e., the VTEP) to which virtual machine 122 is logically coupled. To facilitate the identification, overlay gateway 150 maintains a tunnel mapping between the MAC address of virtual machine 122, and the corresponding VTEP address of virtual switch 134. Note that the tunnel mapping can also include the mapping between the MAC address and the IP address of virtual machine 122.

For example, overlay gateway 150 can obtain such mapping for virtual machine 122 by sending a broadcast (e.g., an Address Resolution Protocol (ARP)) query with virtual machine 122's IP address to obtain the corresponding VTEP address. However, in a large datacenter with a large number of virtual machines, sending a large number of broadcast queries can be inefficient. In some embodiments, overlay gateway 150 communicates with virtualization controller 162 and obtains the tunnel mapping for a respective virtual machine. For virtual machine 122, such mapping can include an identifier to host machine 120 (e.g., a MAC address of a physical network interface of host machine 120), the MAC address of virtual port 123, and the corresponding VTEP address of virtual switch 134. If the mapping is updated (e.g., due to a virtual machine migration) in virtualization controller 162, overlay gateway 150 obtains the updated tunnel mapping from virtualization controller 162.

Based on the obtained tunnel mapping, overlay gateway 150 identifies virtual switch 134 as the VTEP for virtual machine 122, encapsulates the packet from server 144 in a tunnel header, and forwards the encapsulated packet to virtual switch 134. Upon receiving the encapsulated packet, virtual switch 134 removes the encapsulation and provides the packet to virtual machine 122. Suppose that virtualization controller 162 migrates virtual machine 122 to host machine 110. Consequently, the tunnel mapping for virtual machine 122 is updated in virtualization controller 162. The updated mapping for virtual machine 122 includes an identifier to host machine 110 and the corresponding VTEP address of virtual switch 114. Overlay gateway 150 can receive an update message comprising the updated tunnel mapping for from virtualization controller 162.

Figure 1B:
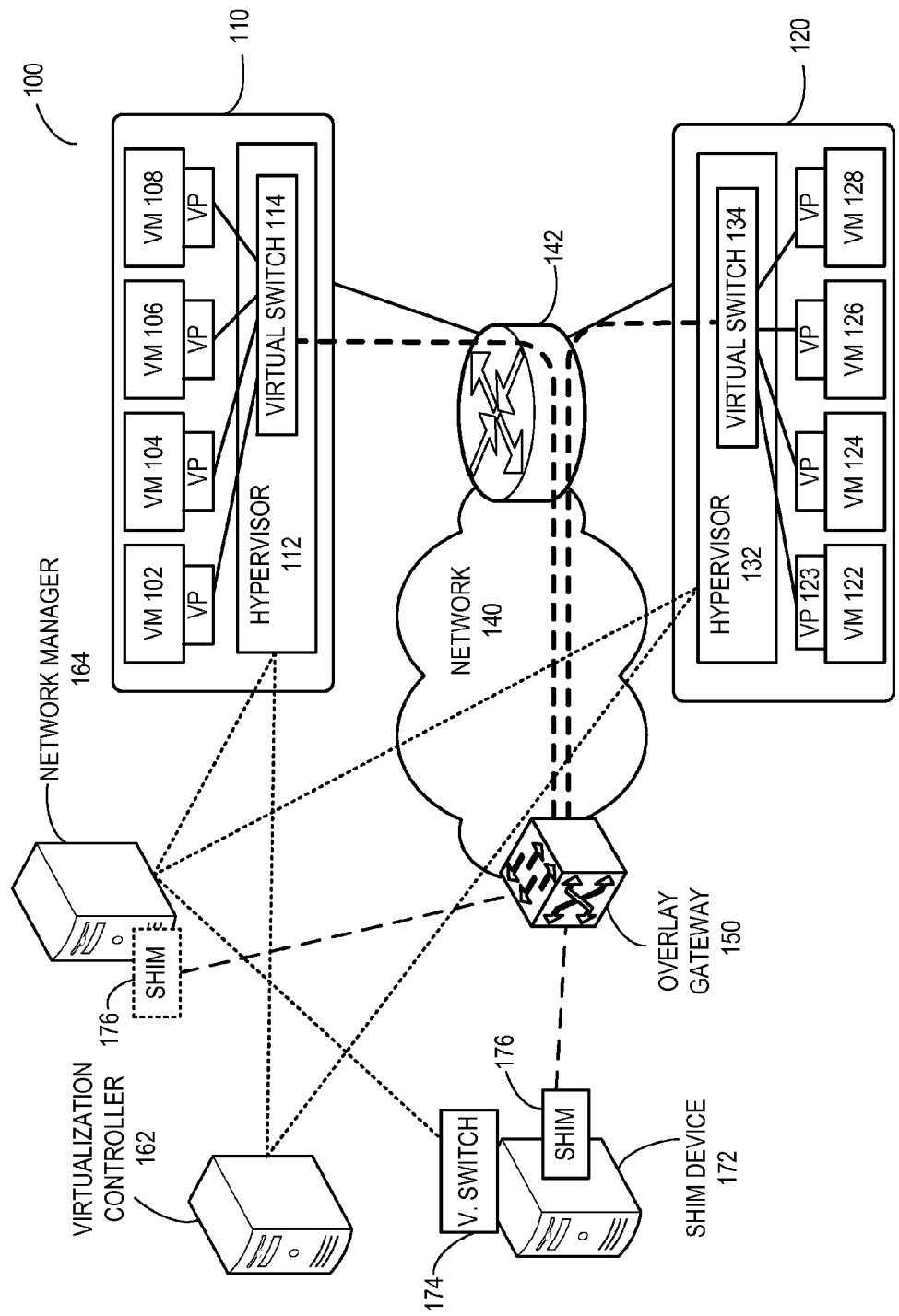
FIG. 1B illustrates an exemplary virtualized network environment with a shim device assisting an overlay gateway, in accordance with an embodiment of the present invention.

In some embodiments, overlay gateway 150 can obtain tunnel mapping from network manager 164. FIG. 1B illustrates an exemplary virtualized network environment with a shim device assisting an overlay gateway in conjunction with the example in FIG. 1A, in accordance with an embodiment of the present invention. Network manager 164 provides a respective virtual switch with networking information required to communicate with each other. To obtain information from network manager 164, virtualized network environment 100 includes a shim device 172, which runs a virtual switch 174. This virtual switch 174 is logically coupled to network manager 164, which considers virtual switch 174 as another virtual switch in a hypervisor. Consequently, network manager 164 provides virtual switch 174 with networking information required to communicate with virtual machines logically coupled to other virtual switches. For virtual machine 122, such information can include an identifier to host machine 120 (e.g., a MAC address of a physical network interface of host machine 120), the MAC address of virtual port 123, and the corresponding VTEP address of virtual switch 134.

Shim device 172 can include a shim layer 176 which communicates with overlay gateway 150. Overlay gateway 150 obtains the networking information via shim layer 176 and constructs the tunnel mapping. Note that networking information may not include the virtual MAC addresses of the virtual machines. Under such a scenario, overlay gateway 150 uses broadcast queries using the virtual IP addresses of the virtual machines to obtain the corresponding virtual MAC addresses. In some embodiments, shim layer 176 can reside on network manager 164 (denoted with dotted lines) and provide networking information to overlay 150, thereby bypassing the shim device 172. However, integrating shim layer 176 with network manager 164 creates additional memory and processing requirements in the physical hardware and may degrade the performance of network manager 164.

FIG. 2 illustrates an exemplary overlay gateway supporting multiple control interfaces and tunneling mechanisms, in accordance with an embodiment of the present invention. Overlay gateway 150 can include two shim layers. One shim layer operates as the control plane 220 and interfaces with virtualization controller 162 for obtaining the mapping. The other shim layer operates as the data plane 210 and facilitates tunnel encapsulation to packets to and from the virtual machines. As a result, overlay gateway 150 can support multiple overlay networks comprising multiple virtualization and tunneling mechanisms.

Control plane 220 includes a number of control interfaces 222, 224, and 226. A respective control interface is capable of communicate with a different virtualization manager. Examples of a control interface include, but are not limited to, interface for VMWareNSX, interface for Microsoft System Center, and interface for OpenStack. For example, control interface 222 can communicate with OpenStack while control interface 224 can communicate with Microsoft System Center. Data plane 210 supports a number of tunneling mechanism 212, 214, and 216. A respective tunneling mechanism is capable of establishing a different overlay tunnel by facilitating a corresponding tunnel encapsulation (i.e., operating as a VTEP for different tunneling mechanisms). Examples of a tunneling mechanism include, but are not limited to, Virtual Extensible Local Area Network (VXLAN), Generic Routing Encapsulation (GRE), and its variations, such as Network Virtualization using GRE (NVGRE) and openvSwitch GRE. For example, tunneling mechanism 212 can represent VXLAN while tunneling mechanism 214 can represent GRE.

With the support of different interfaces and tunneling mechanism, if a datacenter includes a plurality of virtualized network environments from different vendors, the same overlay gateway 150 can serve these environments. In the example in FIG. 1A, if virtual switch 114 supports VXLAN while virtual switch 134 supports GRE, gateway 150 can use tunneling mechanism 212 and 214, respectively, to provide tunnel-encapsulated overlay with virtual switches 114 and 134, respectively. If virtualization controller 162 runs OpenStack, overlay gateway 150 can use interface 222 to obtain the tunnel mapping. Similarly, if virtualization controller 162 is a Microsoft System Center, overlay gateway 150 can use interface 224 to obtain the tunnel mapping.

Packet Format

Figure 3:
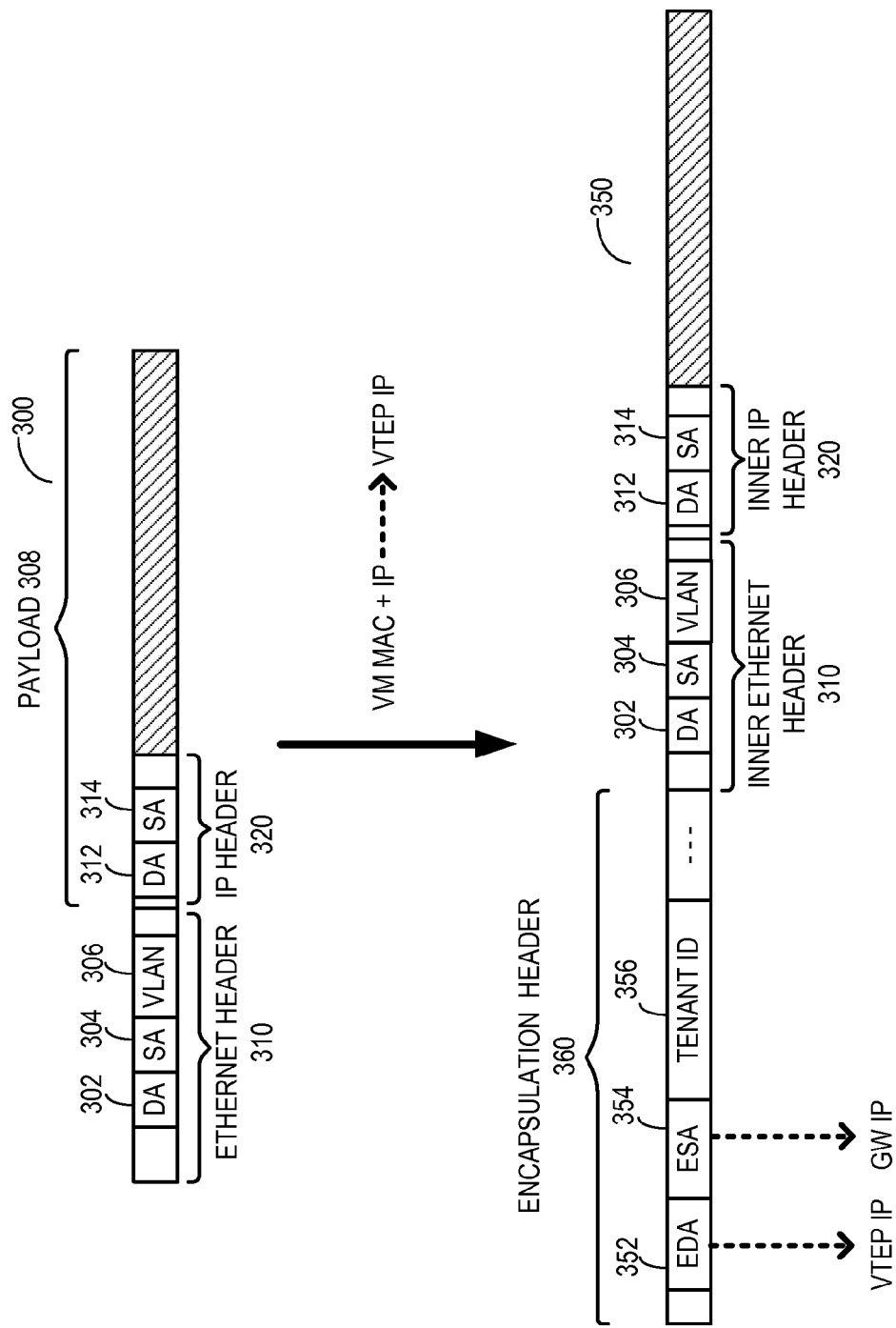
FIG. 3 illustrates an exemplary header format for a conventional packet and its tunnel encapsulation provided by an overlay gateway, in accordance with an embodiment of the present invention.

FIG. 3 illustrates an exemplary header format for a conventional packet and its tunnel encapsulation provided by an overlay gateway, in accordance with an embodiment of the present invention. In this example, a conventional Ethernet packet 300 typically includes a payload 308 and an Ethernet header 310. Typically, payload 308 can include an IP packet which includes an IP header 320. IP header 320 includes an IP destination address (DA) 312 and an IP source address (SA) 314. Ethernet header 310 includes a MAC DA 302, a MAC SA 304, and optionally a virtual local area network (VLAN) tag 306.

Suppose that packet 300 is a packet from server 144 to virtual machine 122 in FIG. 1A. In one embodiment, overlay gateway 150 encapsulates conventional packet 300 into an encapsulated packet 350 based on the tunnel mapping. Encapsulated packet 350 typically includes an encapsulation header 360, which corresponds to an encapsulation mechanism, as described in conjunction with FIG. 2. Encapsulation header 360 contains an encapsulation DA 352, which corresponds to the VTEP IP address of virtual switch 134, and an encapsulation SA 354, which corresponds to the IP address of overlay gateway 150. In the example in FIG. 1A, encapsulated packet 350 is forwarded via network 140 based on encapsulation DA 352. In some embodiments, encapsulation header 360 also includes a tenant identifier 356, which uniquely identifies a tenant in virtualized network environment 100. For example, if encapsulation header 360 corresponds to a tunnel for virtual machine 122, tenant identifier 356 identifies the tenant to which virtual machine 122 belong. In this way, gateway 150 can maintain tenant isolation by using separate tunnel encapsulation for packets for different tenants.

Typically, an upper layer application in server 144 generates an IP packet destined for virtual machine 122, using the virtual IP address of virtual machine 122 as IP DA address 312, and the physical IP address of server 144 as IP SA address 314. This IP packet becomes payload 308. The layer-2 in server 144 then generates Ethernet header 310 to encapsulate payload 308. If server 144 and virtual machine 122 reside within the same logical subnet, MAC DA 302 of Ethernet header 310 is assigned the MAC address of virtual machine 122. MAC SA 304 of Ethernet header 310 is server 144's MAC address. Server 144 then sends Ethernet packet 300 to virtual machine 122 via overlay gateway 150.

When overlay gateway 150 receives Ethernet packet 300 from server 144, overlay gateway 150 inspects Ethernet header 310, and optionally IP header 308 and its payload (e.g., the layer-4 header). Based on this information, overlay gateway 150 determines that Ethernet packet 300 is destined to virtual machine 122 within the same logical subnet. Subsequently, overlay gateway 150 assembles the encapsulation header 360 (corresponding to an encapsulation mechanism). Encapsulation DA 352 of encapsulation header 360 is assigned the IP address of VTEP IP address of virtual switch 134. Encapsulation SA 354 of encapsulation header 360 is overlay gateway 150's IP address. Note that overlay gateway 150's IP address can be a logical IP address as well. Overlay gateway 150 then attaches tenant identifier 356 and forwards encapsulated packet 350 to VTEP virtual switch 134. Upon receiving packet 350, virtual switch 134 removes encapsulation header 360, examines Ethernet header 310 in decapsulated packet 300, and provides decapsulated packet 300 to virtual machine 122.

Operations

Figure 4A:
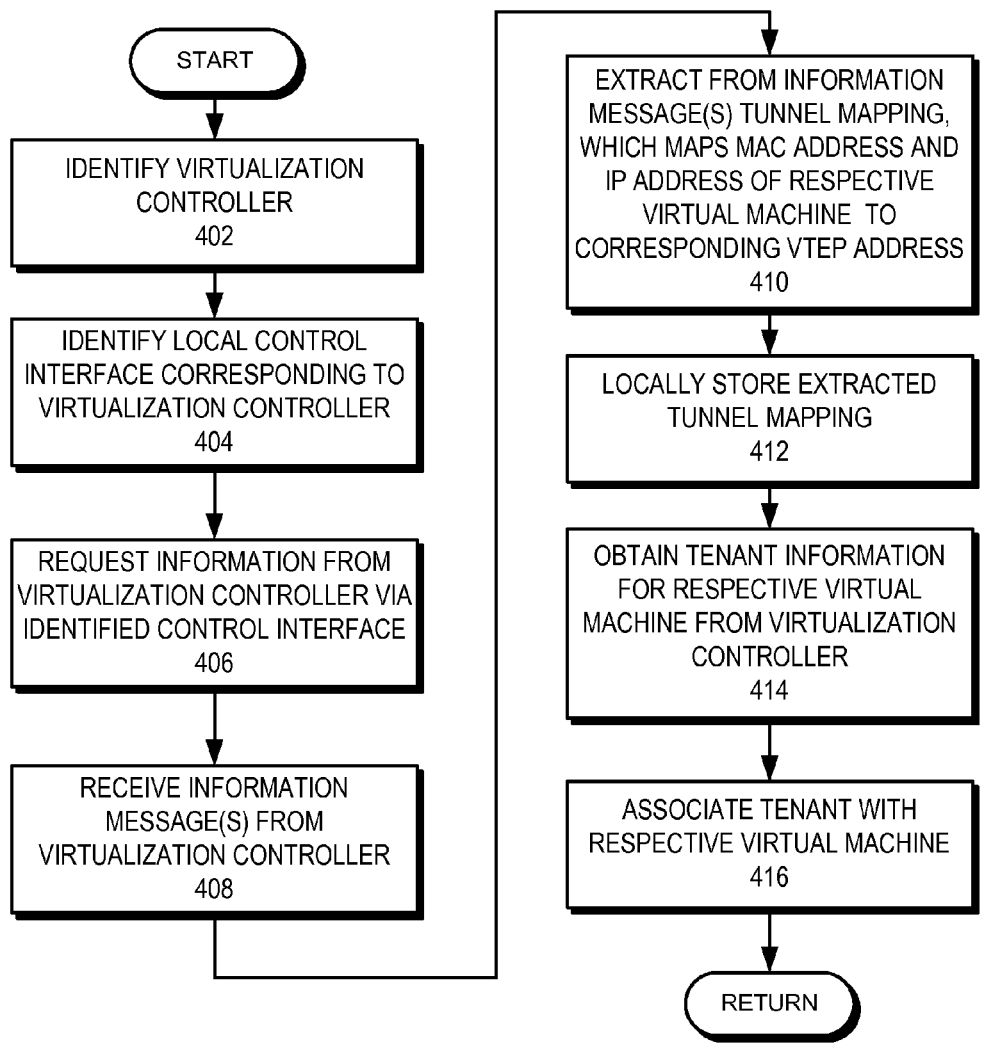
FIG. 4A presents a flowchart illustrating the process of an overlay gateway obtaining a tunnel mapping from a virtualization controller, in accordance with an embodiment of the present invention.

In the example in FIG. 1A, overlay gateway 150 communicates with virtualization controller 162 to obtain a tunnel mapping and forwards received packets via tunnel encapsulation based on the obtained tunnel mapping. FIG. 4A presents a flowchart illustrating the process of an overlay gateway obtaining a tunnel mapping from a virtualization controller, in accordance with an embodiment of the present invention. During operation, the overlay gateway identifies the virtualization controller (operation 402) and identifies the local control interface corresponding to the identified virtualization controller (operation 404), as described in conjunction with FIG. 2. The overlay gateway then requests information from the virtualization controller via the identified control interface (operation 406). In response, the virtual controller sends an information message comprising the relevant tunnel mapping.

The overlay gateway receives this information message (operation 408) and extracts the tunnel mapping from the information message (operation 410). This tunnel mapping maps the MAC address of a respective virtual machine to a corresponding VTEP address. Note that the tunnel mapping can also include the mapping between the MAC address and the IP address of the virtual machine. The overlay gateway then locally stores the extracted tunnel mapping (operation 412). The overlay gateway can also obtain tenant information for a respective virtual machine from the virtualization controller (operation 414) and associates the tenant with the corresponding virtual machine (operation 416). In some embodiments, the overlay gateway can obtain the tenant information as a part of the tunnel mapping.

Figure 4B:
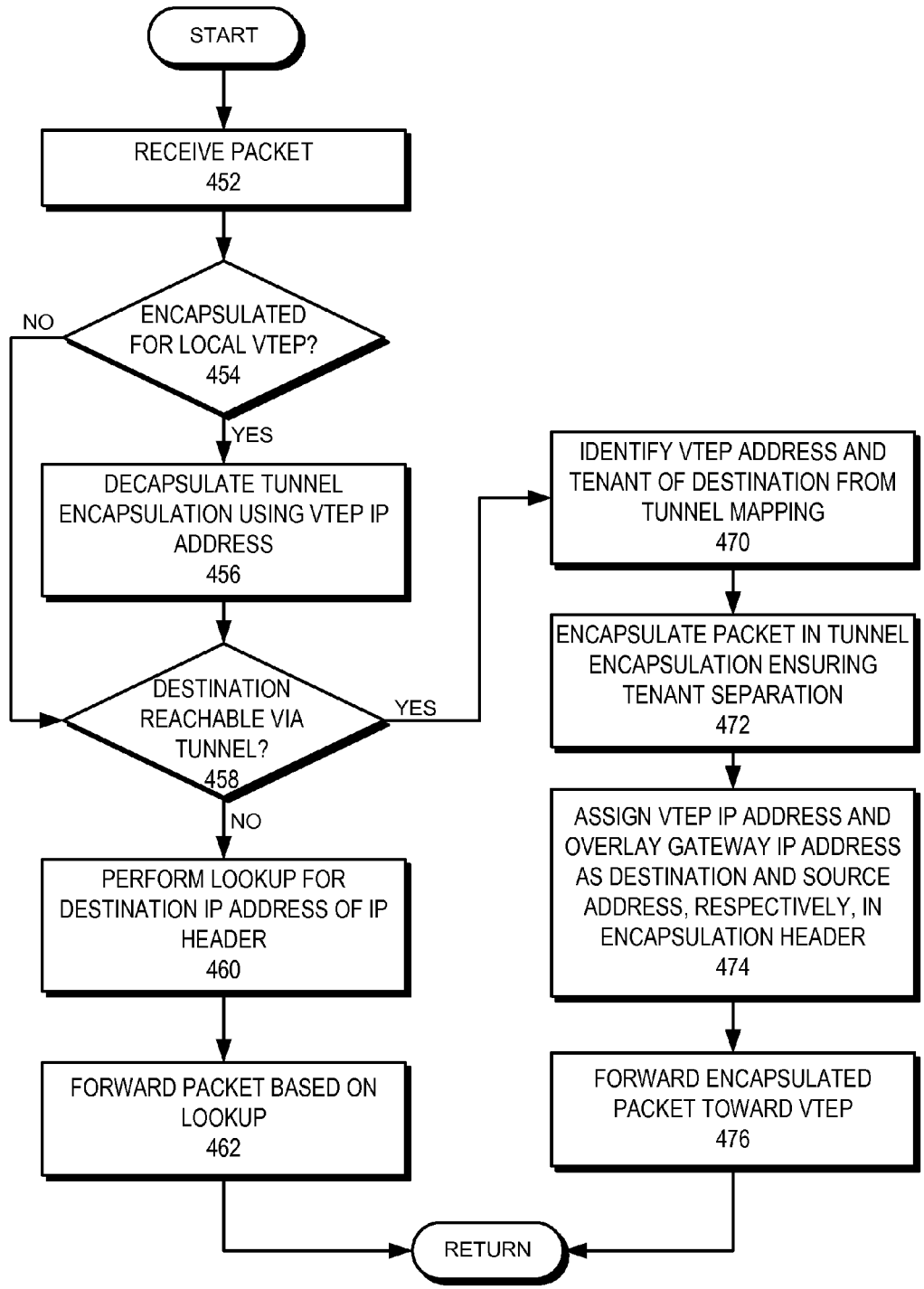
FIG. 4B presents a flowchart illustrating the process of an overlay gateway forwarding a received packet, in accordance with an embodiment of the present invention.

FIG. 4B presents a flowchart illustrating the process of an overlay gateway forwarding a received packet, in accordance with an embodiment of the present invention. Upon receiving a packet (operation 452), the overlay gateway checks whether the packet is encapsulated for a local VTEP (i.e., destined to a VTEP associated with the gateway) (operation 454), as described in conjunction with FIG. 3. If the packet is encapsulated and destined to a VTEP associated with the gateway, the overlay gateway decapsulates the tunnel encapsulation of the packet using VTEP IP address (operation 456). If the packet received by the overlay gateway is not encapsulated (operation 454) or the encapsulation has been decapsulated with overlay gateway VTEP IP address (operation 456), the gateway checks whether the destination of the packet is reachable via a tunnel (e.g., is destined to a virtual machine via the tunnel) (operation 458). When the tunnel encapsulation has been removed from the packet (operation 456) and the destination is not reachable via tunnel (operation 458), the overlay gateway performs a lookup based on the IP address of the IP header (operation 460) and forwards the packet based on the lookup (operation 462). Note that if the packet has been encapsulated, the IP header refers to the inner IP header.

If the packet received by the overlay gateway is not encapsulated for a local VTEP (operation 454) or has been decapsulated with overlay gateway VTEP IP address (operation 456), and the destination is reachable via a tunnel (operation 458), the overlay gateway identifies the VTEP address, and the tenant of the destination from tunnel mapping (operation 470). The overlay gateway can identify the destination by examining the destination IP and/or MAC address of the packet. The overlay gateway then encapsulates the packet in tunnel encapsulation ensuring tenant separation (operation 472). In some embodiments, the overlay gateway uses separate tunnels for separate tenants and can include an identifier to a tenant in the encapsulation header. The overlay gateway assigns the identified VTEP IP address as the destination IP address and the IP address of the overlay gateway as the source IP address of in the encapsulation header (operation 474). Note that if the encapsulation mechanism is based on a layer other than layer-3, the overlay gateway can use VTEP and gateway addresses of the corresponding layer. The overlay gateway then forwards the encapsulated packet toward the VTEP (operation 476).

Typically broadcast, unknown unicast, or multicast traffic (which can be referred to as "BUM" traffic) is distributed to multiple recipients. For ease of deployment, logical switches typically make multiple copies of a packet belonging to such traffic and individually unicast the packets based on tunnel encapsulation towards the virtual switches associated with the same logical subnet. This often leads to inefficient usage of processing capability of the hypervisors, especially in a large scale deployment. To solve this problem, an overlay gateway can facilitate efficient distribution of such traffic. A virtual switch can simply encapsulate the "BUM" packet in tunnel encapsulation and forward the packet to the overlay gateway. The overlay gateway, in turn, forwards the packet in the logical subnet.

Figure 4C:
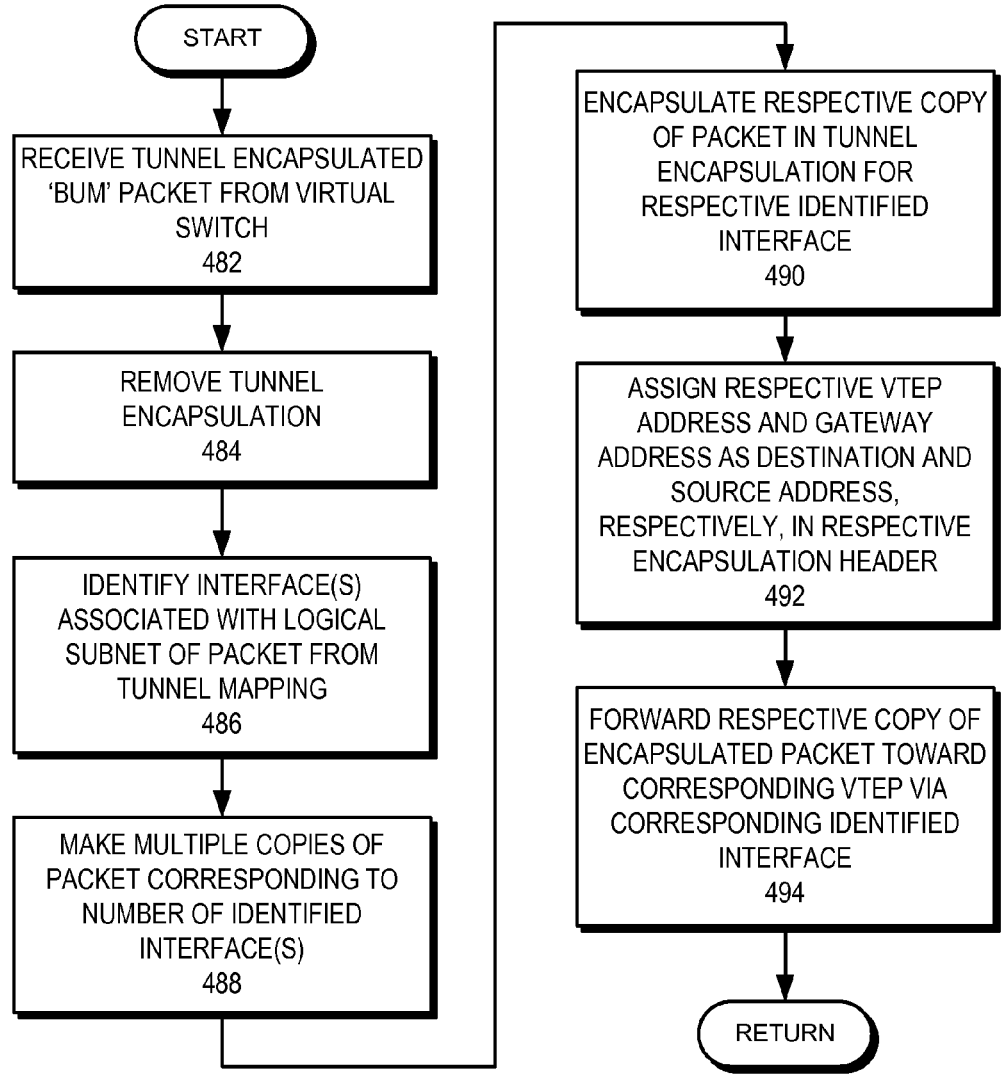
FIG. 4C presents a flowchart illustrating the process of an overlay gateway forwarding a broadcast, unknown unicast, or multicast packet in a logical subnet, in accordance with an embodiment of the present invention.

FIG. 4C presents a flowchart illustrating the process of an overlay gateway forwarding a broadcast, unknown unicast, or multicast packet in a logical subnet, in accordance with an embodiment of the present invention. During operation, the overlay gateway receives a tunnel encapsulated packet belonging to broadcast, unknown unicast, or multicast traffic (operation 482). The overlay gateway removes the tunnel encapsulation (operation 484) and identifies the interface(s) associated with the logical subnet of the packet from tunnel mapping (operation 486). Because the virtual switch from which the overlay gateway has received the packet is responsible for distributing the packet to the member virtual machines of the logical subnet, the overlay gateway does not forward the packet toward that virtual switch.

The overlay gateway then makes multiple copies of the packet corresponding to the number of identified interface(s) (operation 488) and encapsulate a respective copy of the packet in tunnel encapsulation for respective identified interface (operation 490). Because the overlay gateway supports multiple tunneling mechanisms, as described in conjunction with FIG. 2, the overlay gateway can still distribute the packet if different virtual switches associated with the logical subnet support different tunneling mechanisms. The overlay gateway assigns a respective identified VTEP IP address as the destination IP address, and the IP address of the overlay gateway as the source IP address of in a respective encapsulation header (operation 492). Note that if the encapsulation mechanism is based on a layer other than layer-3, the overlay gateway can use VTEP and gateway addresses of the corresponding layer. The overlay gateway then forwards respective copy of the encapsulated packet toward the corresponding VTEP via a corresponding identified interface (operation 494).

High Availability

Figure 5A:
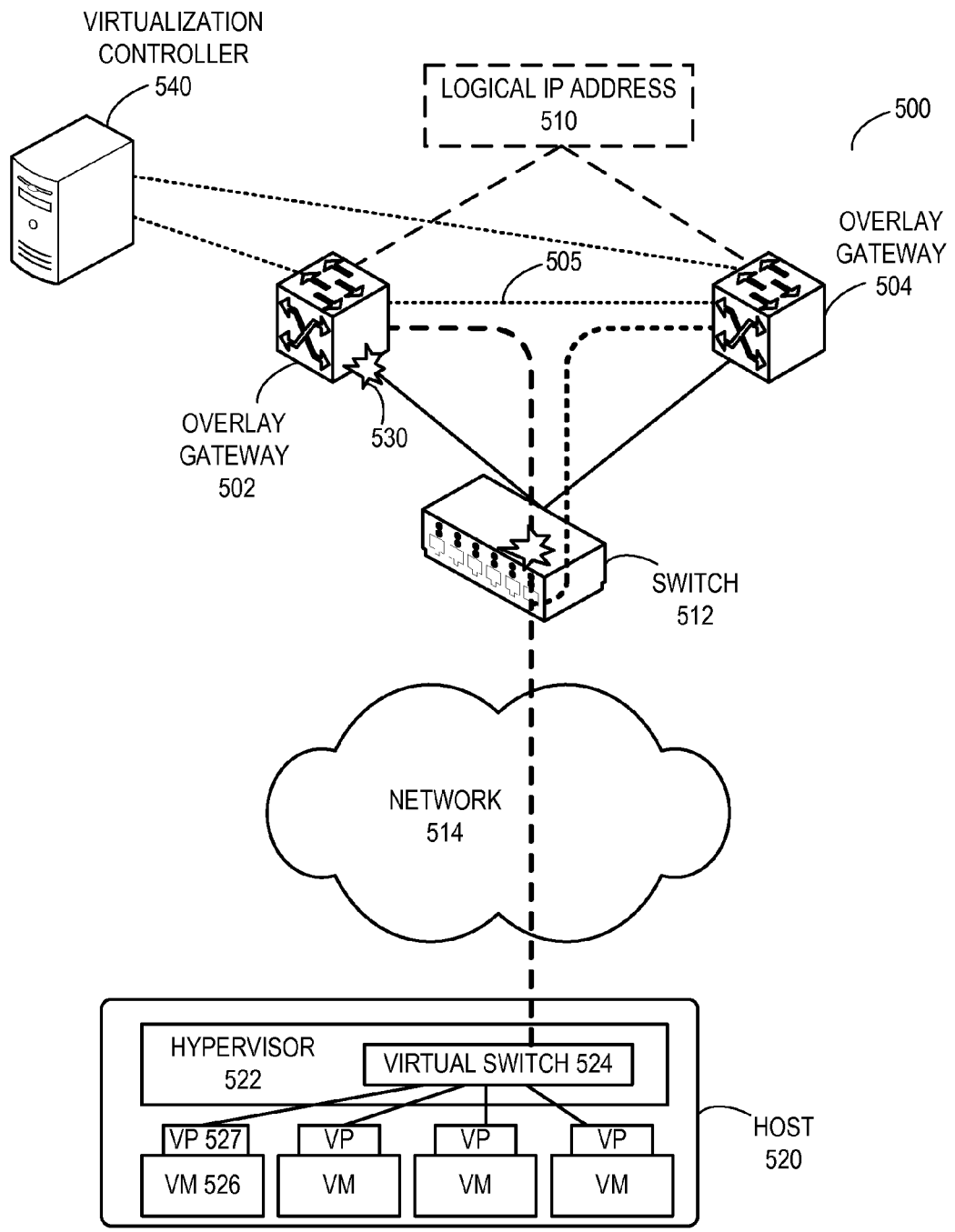
FIG. 5A illustrates an exemplary an overlay gateway with high availability, in accordance with an embodiment of the present invention.

In the example in FIG. 1A, if overlay gateway 150 fails or encounters a link failure, overlay gateway 150 can no longer operate as the gateway. Hence, providing high-availability to overlay gateway 150 is essential. FIG. 5A illustrates an exemplary an overlay gateway with high availability, in accordance with an embodiment of the present invention. As illustrated in FIG. 5A, a virtualized network environment 500, which can be in a datacenter, includes a host machine 520 coupled to a switch 512 in network 514 via one or more hops. A number of virtual machines run on hypervisor 522 in host machine 520. A respective virtual machine has a virtual port. The virtual port of a respective virtual machine running on hypervisor 522 is logically coupled to a virtual switch 524 which is provided by hypervisor 522. Also included is a virtualization controller 540, which allocates a respective virtual machine to a hypervisor in a host machine, and assigns virtual MAC and IP addresses to the virtual machine.

Virtualized network environment 500 also includes overlay gateways 502 and 504, coupled to each other via logical link 505. Logical link 505 can include one or more physical links, interconnected via layer-2 and/or layer-3. In this example, overlay gateway 502 remains actively operational while overlay gateway 504 operates as a standby gateway for overlay gateway 502. In some embodiments, overlay gateway 502 communicates with virtualization controller 540 and obtains the corresponding tunnel mapping for a respective virtual machine. In some embodiments, upon obtaining the tunnel mapping, overlay gateway sends an information message comprising the tunnel mapping to overlay gateway 504. In this way, both overlay gateways 502 and 504 can have the same tunnel mapping. If the mapping is updated (e.g., due to a virtual machine migration) in virtualization controller 540, as described in conjunction with FIG. 1A, overlay gateway 502 obtains the updated tunnel mapping from virtualization controller 540 and sends an information message comprising the updated tunnel mapping to overlay gateway 504. In some embodiments, overlay gateways 502 and 504 individually obtain the tunnel mapping from virtualization controller 540.

Overlay gateways 502 and 504 can share a logical IP address 510. While operational, active overlay gateway 502 uses logical IP address 510 as the VTEP address while standby overlay gateway 504 suppresses the operations (e.g., ARP response) associated with logical IP address 510. As a result, only overlay gateway 502 responds to any ARP query for logical IP address 510. Consequently, switch 512 only learns the MAC address of overlay gateway 502 and forwards all subsequent packets to overlay gateway 502.

During regular operation, overlay gateway 502 facilitate virtual tunneling to logical switch 524, which is a VTEP for virtual machine 526 in host machine 520, via network 514. Upon obtaining a packet from virtual machine 526, virtual switch 524 encapsulates the packet in a tunnel header and forwards the encapsulated packet toward overlay gateway 502. Because switch 512 has only learned the MAC address of overlay gateway 502, switch 512 forwards the packet to overlay gateway 502. Upon receiving the encapsulated packet, overlay gateway 502 removes the tunnel encapsulation and forwards the packet toward the destination address of the packet.

Overlay gateways 502 and 504 can exchange "keep alive" messages via link 505 to notify each other regarding their active status. Suppose that failure 530 causes a link or device failure which makes overlay gateway 502 unavailable. Overlay gateway 504 detects failure 530 by not receiving the keep alive message from overlay gateway 502 for a predetermined period of time and assumes the operations associated with logical IP address 510. Due to the failure of overlay gateway 502, switch 512 typically clears the learned MAC address of gateway 502. In some embodiments, overlay gateway 504 sends a gratuitous ARP response message, which allows switch 512 to learn the MAC address of overlay gateway 504 and update its forwarding table accordingly. Based on the updated forwarding table, switch 512 forwards the subsequent packets from virtual machine 526 to overlay gateway 504. Upon receiving the encapsulated packet, overlay gateway 504 removes the tunnel encapsulation and forwards the packet toward the destination address of the packet.

Figure 5B:
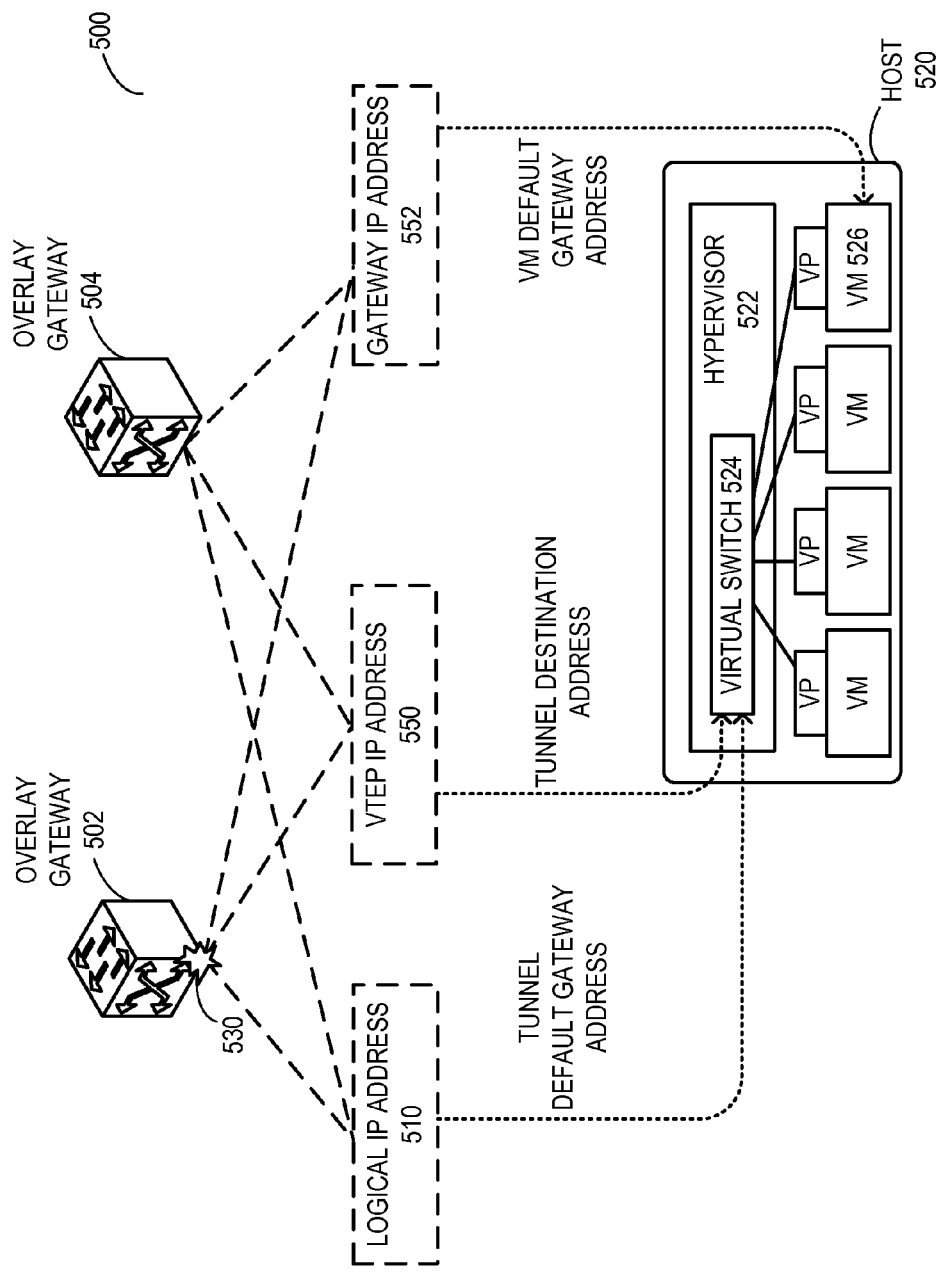
FIG. 5B illustrates an exemplary usage of multiple addresses of an overlay gateway with high availability, in accordance with an embodiment of the present invention.

FIG. 5B illustrates an exemplary usage of multiple addresses of an overlay gateway with high availability, in accordance with an embodiment of the present invention. In this example, overlay gateways 502 and 504 can have different IP addresses for different purposes. For example, besides logical IP address 510, overlay gateways 502 and 504 can have VTEP IP address 550 and gateway IP address 552. Virtual machine 524 uses gateway IP address 552 as the default gateway address. Hence, if virtual machine 526 needs to send a packet outside of its logical subnet, virtual machine 526 sends ARP request to gateway IP address 552. In some embodiments, overlay gateways 502 and 504 can have a respective gateway IP address for a respective logical subnet to operate as the default gateway for the logical subnet.

Virtual switch 524 uses logical IP address 510 as the default gateway address and VTEP IP address 550 as the default tunnel destination address. VTEP IP address 550 can be outside of the logical subnet(s) associated with the virtual machines in host machine 520. For sending a tunnel-encapsulated packet to VTEP IP address 550, virtual switch 524 sends ARP request to logical IP address 510. Because all encapsulated packets destined to VTEP IP address 550 is directed toward logical IP address 510, overlay gateway 502 receives the packet and takes appropriate action. In this way, a single VTEP IP address 550, which can be outside of the logical subnets associated with a respective virtual machine, operate as the tunnel destination address for all logical subnets.

Upon detecting failure 530, overlay gateway 504 assumes the operations associated with logical IP address 510, as described in conjunction with FIG. 5A. Because all encapsulated packets destined to VTEP IP address 550 are directed toward logical IP address 510, the encapsulated packets are directed toward overlay gateway 504. Hence, providing high availability to only logical IP address 510 is sufficient to ensure high availability to tunnel encapsulated packets destined to VTEP IP address 550. However, if VTEP IP address 550 is in the logical subnet of virtual machine 526, virtual machine 526 directly sends packets to VTEP IP address 550. Under such a scenario, providing high availability to VTEP IP address 550 is also necessary.

Exemplary Overlay Gateway

Figure 6:
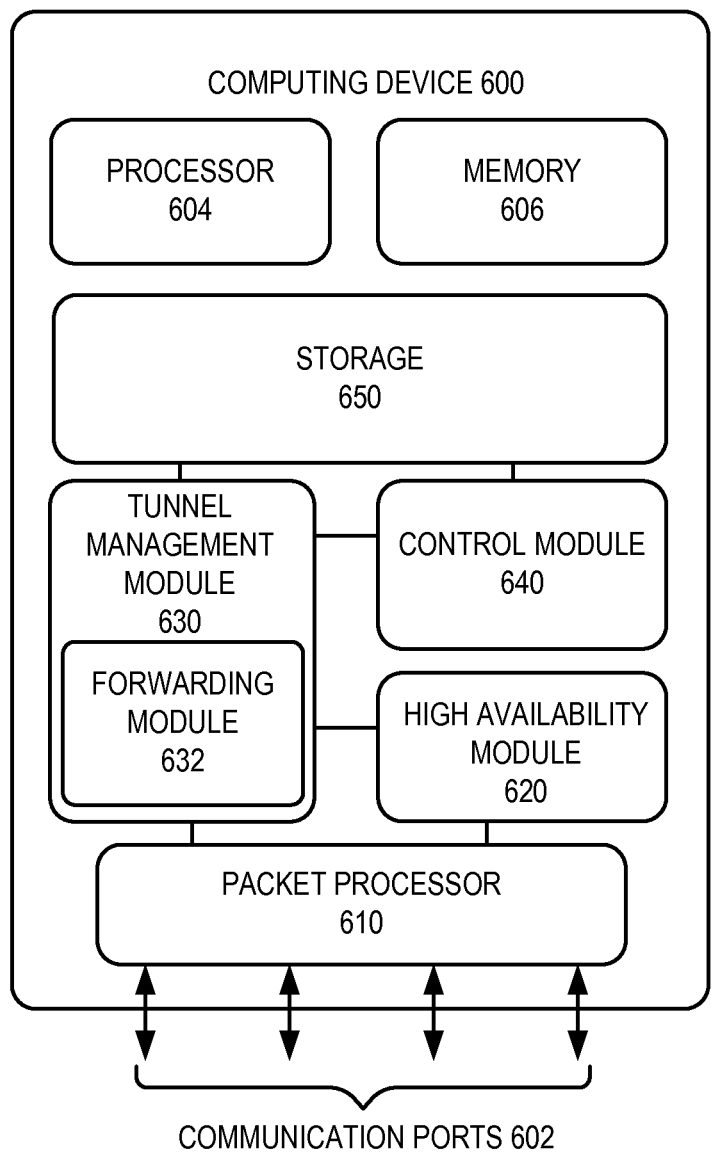
FIG. 6 illustrates an exemplary computing system operating as an overlay gateway, in accordance with an embodiment of the present invention.

FIG. 6 illustrates an exemplary computing system operating as an overlay gateway, in accordance with an embodiment of the present invention. In this example, a computing system 600 includes a general purpose processor 604, a memory 606, a number of communication ports 602, a packet processor 610, a tunnel management module 630, a forwarding module 632, a control module 640, a high availability module 620, and a storage 650. Processor 604 executes instructions stored in memory 606 to operate computing system 600 as an overlay gateway, which initiates or terminates an overlay tunnel associated with a virtual machine.

During operation, one of the communication ports 602 receives a packet from a configuration system. This configuration system can be one or more of: a virtualization controller, a network manager, and a shim device. Packet processor 610, in conjunction with control module 640, extracts a tunnel mapping from the received packet. This tunnel mapping maps a virtual IP address and/or a MAC address of the virtual machine to a VTEP IP address. Control module 640 stores the tunnel mapping in storage 650 and loads in memory 606 during operation. When the mapping is updated, control module 640 also updates the mapping, as described in conjunction with FIG. 1A. Tunnel management module 630 recognizes a plurality of overlay tunneling mechanisms. When a data packet destined to the virtual machine is received, forwarding module 632 obtain the VTEP IP address from the mapping for the virtual machine, encapsulates the packet based on a recognized tunneling mechanism, and determines an output port among the communication ports 602 for the data packet based on the VTEP IP address.

High availability module 620 associates computing system 600 with a logical IP address, which is also associated with a remote computing system, as described in conjunction with FIG. 5A. High availability module 620 determines whether computing system 600 is an active or a standby overlay gateway. If computing system 600 is a standby overlay gateway, processor 604 precludes packet processor 610 from processing a packet associated with the logical IP address. When high availability module 620 detects a failure of the remote computing system, packet processor 610 starts processing packets associated with the logical IP address. In some embodiments, high availability module 620 also associates computing system 600 with a VTEP address, which belongs to a subnet different from a subnet to which the logical IP address belongs, as described in conjunction with FIG. 5B.

Note that the above-mentioned modules can be implemented in hardware as well as in software. In one embodiment, these modules can be embodied in computer-executable instructions stored in a memory which is coupled to one or more processors in computing system 600. When executed, these instructions cause the processor(s) to perform the aforementioned functions.

In summary, embodiments of the present invention provide a computing system and a method for facilitating layer-3 overlay tunneling. In one embodiment, the computing system includes a processor and a computer-readable storage medium for storing instructions. Based on the instructions, the processor operates the computing system as an overlay gateway. The computing system initiates and terminates an overlay tunnel associated with a virtual machine. During operation, the computing system maps a virtual Internet Protocol (IP) address of the virtual machine to a second IP address used to terminate the overlay tunnel based on information received from a configuration system. The computing system then determines an output port for a data packet based on the second IP address. The data packet comprises an inner packet and the destination address of this inner packet corresponds to the virtual IP address.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computing means, comprising:
    a storage means for storing data;
    a mapping means for storing in the mapping means a mapping between a virtual Internet Protocol (IP) address of a virtual machine and a tunnel IP address assigned to a virtual tunnel endpoint of an overlay tunnel;
    a tunneling means for, in response to identifying the virtual IP address as a destination address of a packet, encapsulating the packet with an encapsulation header associated with the overlay tunnel, wherein the tunnel IP address is a destination address of the encapsulation header;
    a forwarding means for determining an output port for the encapsulated packet based on the tunnel IP address.

2. A computing system, comprising:
    a processor;
    forwarding circuitry;

a storage device;
a plurality of ports;
a computer-readable storage medium storing instructions which when executed by the processor causes the processor to perform a method, the method comprising:
storing, in the storage device, a mapping between a virtual Internet Protocol (IP) address of a virtual machine and a tunnel IP address assigned to a virtual tunnel endpoint of an overlay tunnel; and
in response to identifying the virtual IP address as a destination address of a header of a packet, causing the forwarding circuitry to:
encapsulate the packet with an encapsulation header associated with the overlay tunnel, wherein the tunnel IP address is a destination address of the encapsulation header; and
determine an output port, from the plurality of ports, for the encapsulated packet based on the tunnel IP address.

3. The computing system of claim 2, wherein the computing system and a remote computing system operate as the virtual tunnel endpoint for the overlay tunnel, wherein the tunnel IP address is associated with the computing system and the remote computing system.

4. The computing system of claim 3, wherein the method further comprises:
determining that the computing system is a standby for the remote computing system.

5. The computing system of claim 4, wherein the method further comprises:
detecting a failure of the remote computing system; and
encapsulating the packet with the encapsulation header in response to detecting the failure.

6. The computing system of claim 2, wherein the mapping is based on information received from a configuration system; and
wherein the configuration system is one or more of:
a virtualization controller configured to allocate the virtual machine to a hypervisor in a host machine and assigns the virtual IP addresses to the virtual machine;
a network manager configured to notify the hypervisor regarding networking information; and
a shim device configured to obtain networking information from the network manager.

7. The computing system of claim 6, further comprising a shim control plane layer configured to recognize a plurality of virtualization controllers, wherein a respective virtualization controller corresponds to a different virtualization mechanism.

8. The computing system of claim 2, wherein the mapping further includes a virtual media access control (MAC) address of the virtual machine.

9. The computing system of claim 2, wherein the method further comprises updating the mapping, wherein the updated mapping maps the virtual IP address of the virtual machine to a second tunnel IP address, wherein the second tunnel IP address is used to determine output port for a second packet with the virtual IP address as a destination address of a header of the second packet.

10. The computing system of claim 2, further comprising a shim data plane layer configured to recognize a plurality of overlay tunneling mechanisms.

11. The computing system of claim 2, wherein the overlay tunnel is associated with one or more of:
a Virtual Extensible Local Area Network (VXLAN);
a Generic Routing Encapsulation (GRE) protocol;
a Network Virtualization using GRE (NVGRE) protocol; and
an openvSwitch GRE protocol.

12. The computing system of claim 2, wherein the tunnel IP address belongs to a subnet different from a subnet to which the virtual IP address belongs.

13. A method, comprising:
storing, in a storage device of a computing system, a mapping between a virtual Internet Protocol (IP) address of a virtual machine and a tunnel IP address assigned to a virtual tunnel endpoint of an overlay tunnel;
in response to identifying the virtual IP address as a destination address of a header of a packet, encapsulating the packet with an encapsulation header associated with the overlay tunnel, wherein the tunnel IP address is a destination address of the encapsulation header; and
determining an output port for the encapsulated packet based on the tunnel IP address.

14. The method of claim 13, wherein the computing system and a remote computing system operate as the virtual tunnel endpoint for the overlay tunnel, wherein the tunnel IP address is associated with the computing system and the remote computing system.

15. The method claim 14, further comprising:
determining that the computing system is a standby for the remote computing system.

16. The method of claim 15, further comprising:
detecting a failure of the remote computing system; and
encapsulating the packet with the encapsulation header in response to detecting the failure.

17. The method of claim 13, wherein the mapping is based on information received from a configuration system; and
wherein the configuration system is one or more of:
a virtualization controller configured to allocate the virtual machine to a hypervisor in a host machine and assigns the virtual IP addresses to the virtual machine;
a network manager configured to notify the hypervisor regarding networking information; and
a shim device configured to obtain networking information from the network manager.

18. The method of claim 17, further comprising recognizing a plurality of virtualization controllers, wherein a respective virtualization controller corresponds to a different virtualization mechanism.

19. The method of claim 13, wherein the mapping further includes a virtual media access control (MAC) address of the virtual machine.

20. The method of claim 13, further comprising updating the mapping, wherein the updated mapping maps the virtual IP address of the virtual machine to a second tunnel IP address, wherein the second tunnel IP address is used to determine the output port for a second packet with the virtual IP address as a destination address of a header of the second packet.

21. The method of claim 13, further comprising recognizing a plurality of overlay tunneling mechanisms.

22. The method of claim 13, wherein the overlay tunnel is associated with one or more of:
a Virtual Extensible Local Area Network (VXLAN);
a Generic Routing Encapsulation (GRE) protocol;
a Network Virtualization using GRE (NVGRE) protocol; and
an openvSwitch GRE protocol.

23. The method of claim 13, wherein the tunnel IP address belongs to a subnet different from a subnet to which the virtual IP address belongs.

\* \* \* \* \*